United States Patent [19]

Duffy et al.

[11] Patent Number: 5,262,907
[45] Date of Patent: Nov. 16, 1993

[54] HARD DISC DRIVE WITH IMPROVED SERVO SYSTEM

[75] Inventors: Dennis D. Duffy, Oklahoma City; Lealon R. McKenzie, Edmond; Fereidoon Heydari; Philip R. Woods, both of Oklahoma City, all of Okla.

[73] Assignee: Seagate Technology, Inc., Scotts Valley, Calif.

[21] Appl. No.: 738,053

[22] Filed: Jul. 31, 1991

[51] Int. Cl.$^5$ .................. G11B 5/56; G11B 5/596; G11B 21/10; G11B 5/82

[52] U.S. Cl. ................. 360/77.05; 360/78.14; 360/135; 369/32; 369/44.26; 369/44.28; 395/275; 395/425

[58] Field of Search ............... 360/77.01, 77.05, 78.01, 360/135, 130.34, 78.14; 369/32, 44.26, 44.28; 395/275, 425

[56] References Cited

U.S. PATENT DOCUMENTS

| | | | |
|---|---|---|---|
| 4,048,660 | 9/1977 | Dennison et al. | 360/77 |
| 4,068,267 | 1/1978 | Inouye | 360/77.05 |
| 4,258,622 | 3/1981 | Estrabaud et al. | 101/93.01 |
| 4,381,526 | 4/1983 | McLaughlin et al. | 360/78 |
| 4,539,607 | 9/1985 | Fujiki | 360/77 |
| 4,602,304 | 7/1986 | Fultz | 360/77 |
| 4,636,885 | 1/1987 | Yamada et al. | 360/78 |
| 4,638,230 | 1/1987 | Lee | 318/632 |
| 4,638,384 | 1/1987 | Stewart et al. | 360/77.05 |
| 4,692,678 | 9/1987 | Lee | 318/687 |
| 4,701,898 | 10/1987 | Giddings | 369/32 |
| 4,737,869 | 4/1988 | Sugaya et al. | 360/135 |
| 4,745,497 | 5/1988 | Ozawa | 360/77 |
| 4,823,212 | 4/1989 | Knowles et al. | 360/135 |
| 4,956,831 | 9/1990 | Sarraf et al. | 369/32 |
| 4,964,009 | 10/1990 | Moriya et al. | 360/135 |
| 4,977,472 | 12/1990 | Volz et al. | 360/78.14 |
| 4,987,355 | 1/1991 | Leaper et al. | 318/561 |
| 5,062,023 | 10/1991 | Squire | 369/44.28 |
| 5,065,382 | 11/1991 | Seko et al. | 369/44.26 |
| 5,095,393 | 3/1992 | Janz | 360/77.05 |
| 5,095,471 | 3/1992 | Sidman | 369/32 |
| 5,153,787 | 10/1992 | Sidman | 360/77.05 |
| 5,164,931 | 11/1992 | Yamaguchi et al. | 369/32 |

FOREIGN PATENT DOCUMENTS 0236195  9/1987  European Pat. Off. .
1-154376 6/1989  Japan .

Primary Examiner—John Zazworsky
Attorney, Agent, or Firm—Edward P. Heller, III; Bill D. McCarthy; Louis W. Watson

[57] ABSTRACT

A hard disc drive having a digital servo system for controlling the position of a servo head on a dedicated servo surface. The servo surface is formatted in a series of consecutive frames along concentric tracks, each frame passing the servo head in a time that defines a sampling interval for the servo system. The frames contain track address and position fields for locating the servo head and location can be effected in relation to limited or extended fine control regions about the tracks via signals transmitted to a position circuit utilized to generate a servo position error from the position field. The position circuit generates a track phase code for checking track addresses generated by a track address circuit used to generate a track address from the address field. Servo routines are carried out by a servo microcomputer using control equations, stored in the servo microcomputer, having coefficients stored in a system microcomputer that transmits the coefficients with command to carry out servo operations. Writing of data to data tracks is disabled when an effective head to track distance, defined in relation to actual distance and head speed exceeds an on track threshold.

11 Claims, 22 Drawing Sheets

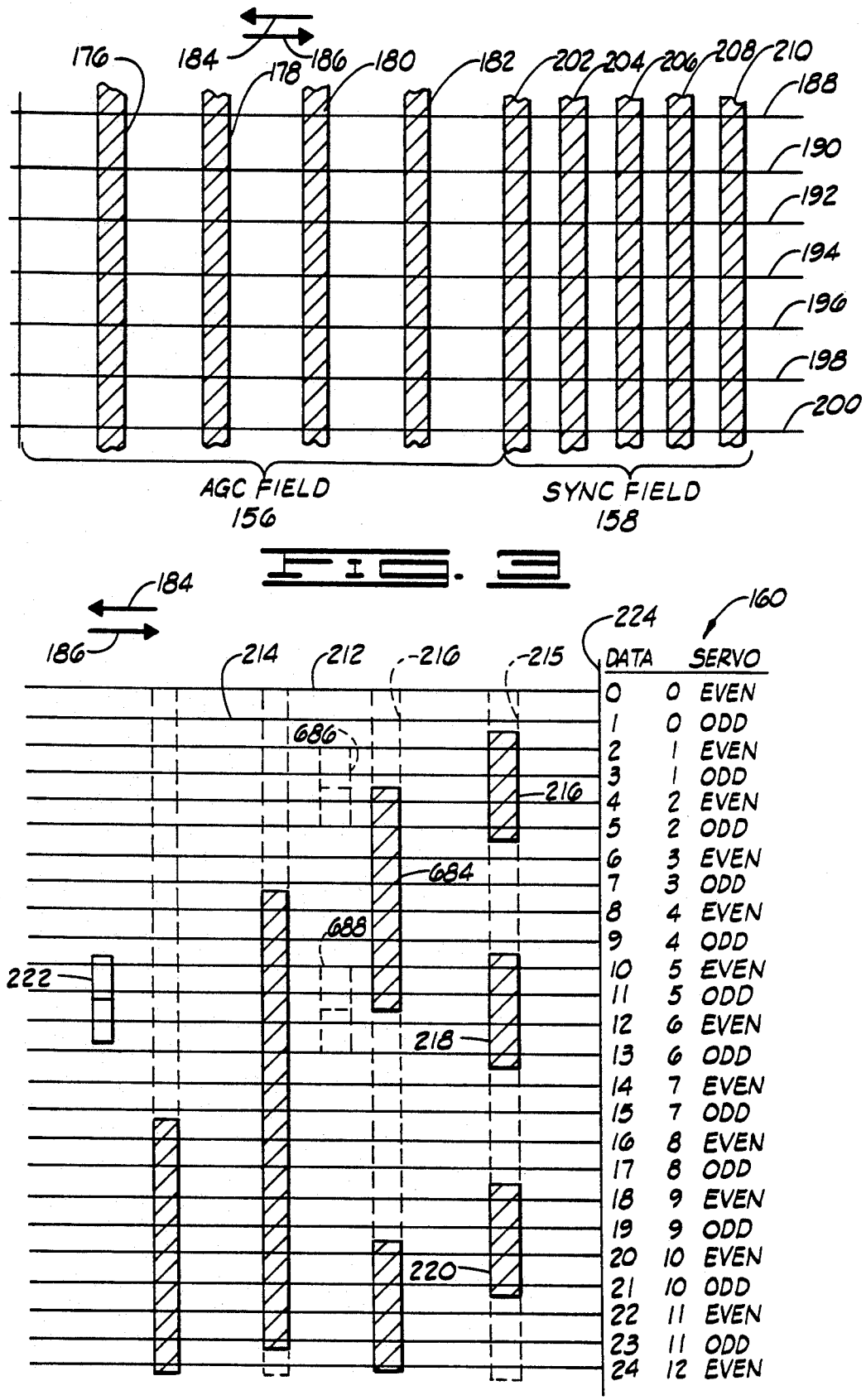

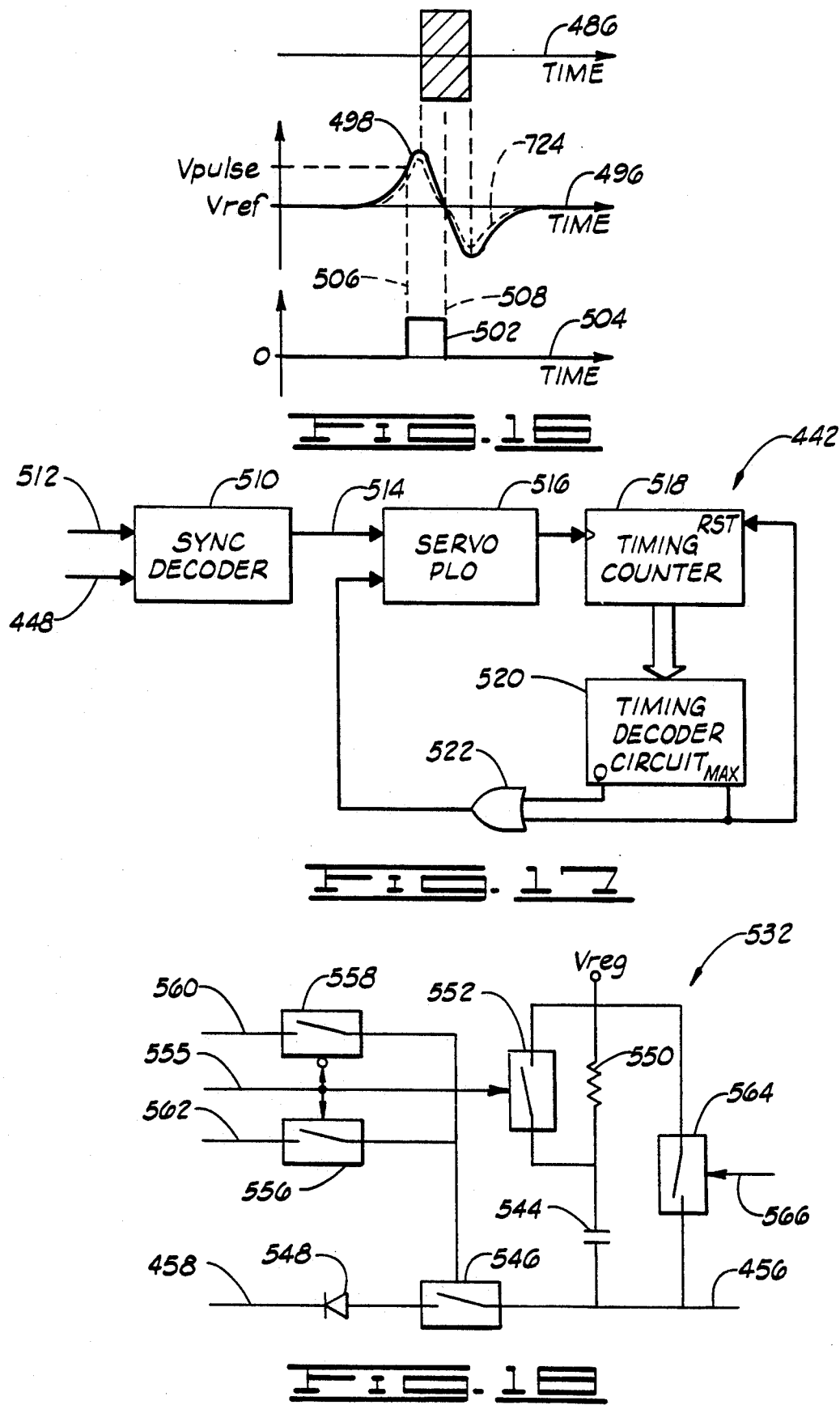

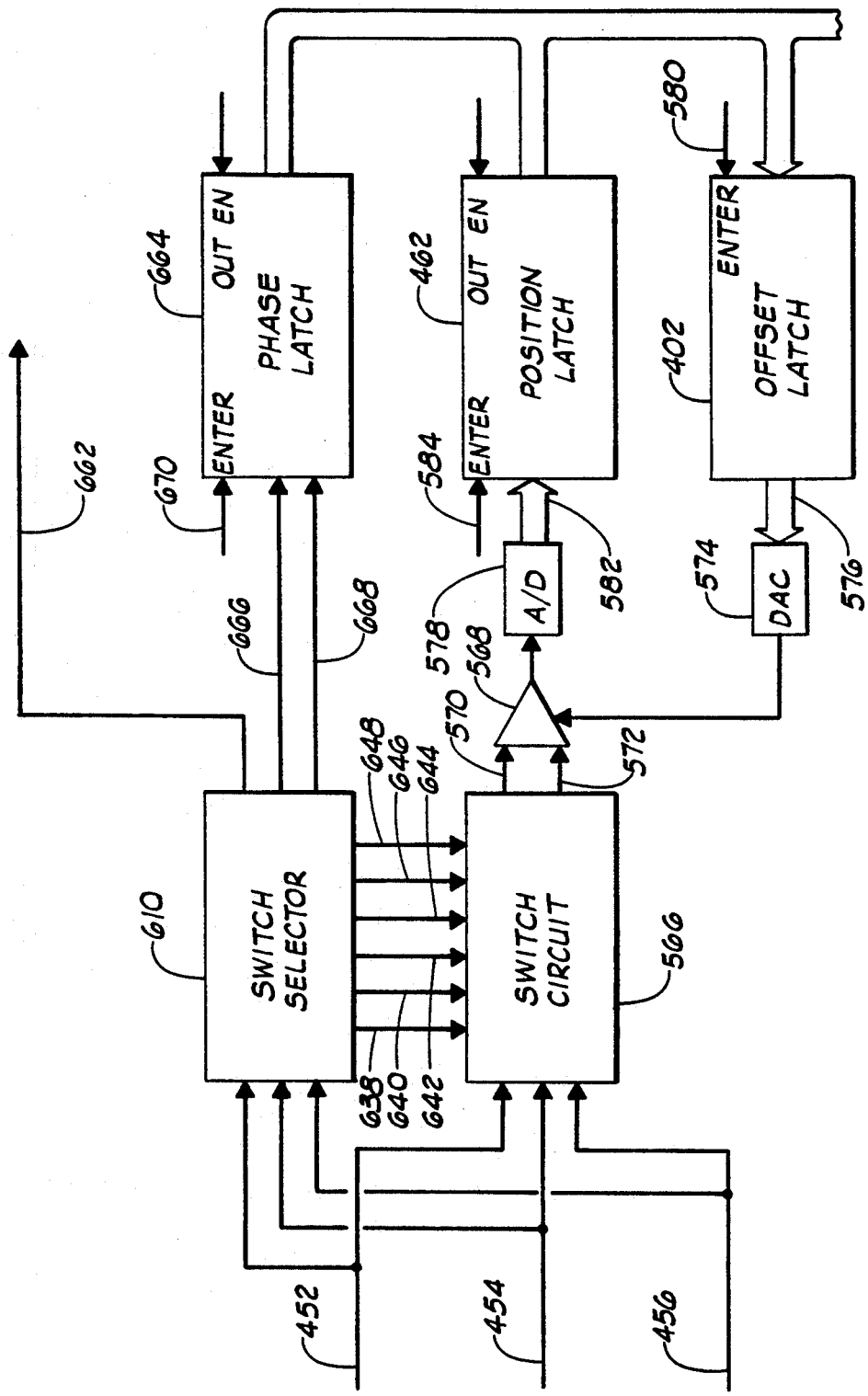

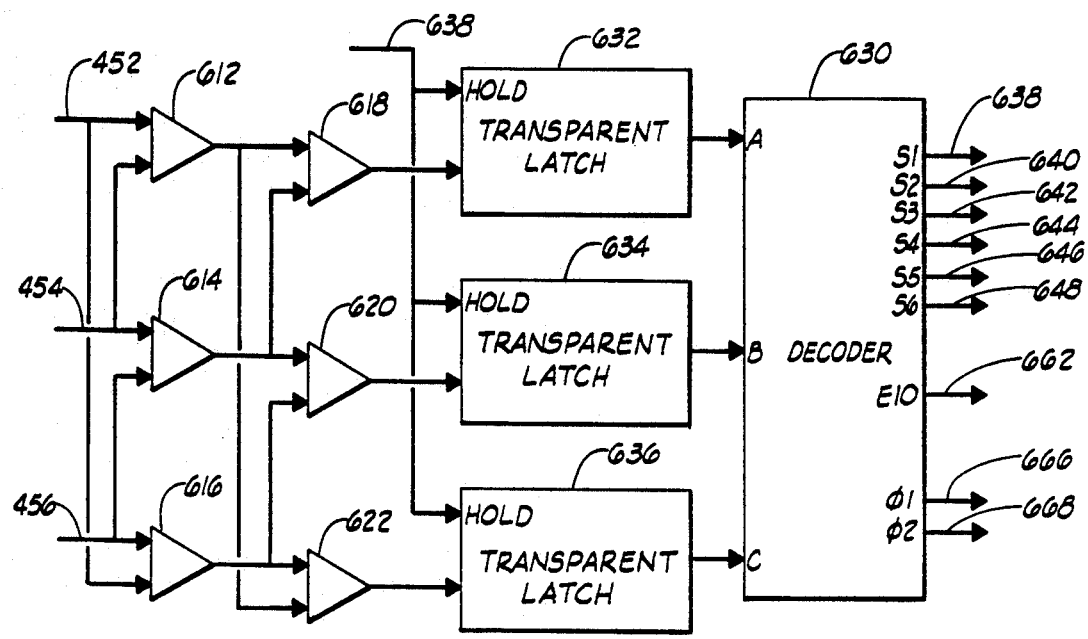
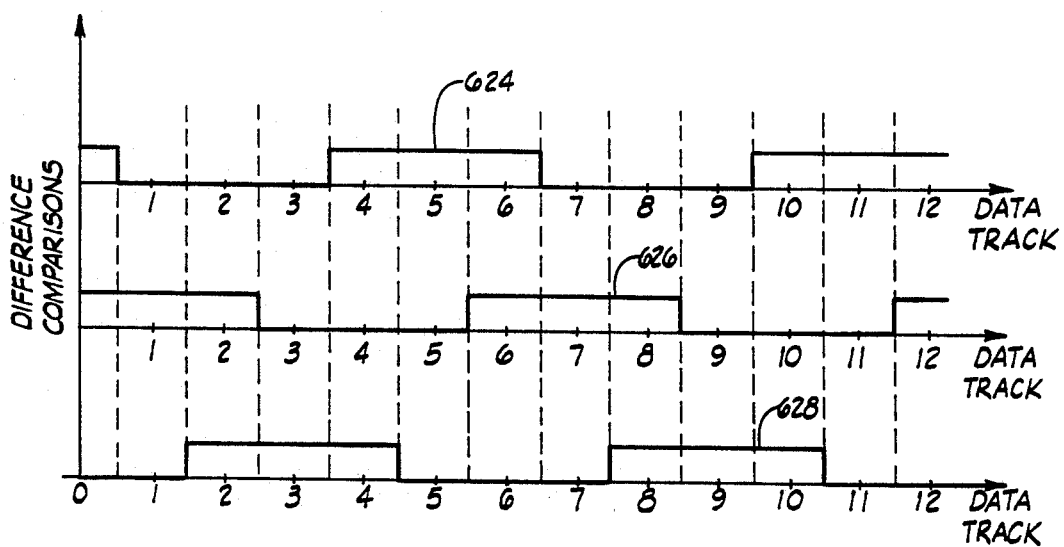

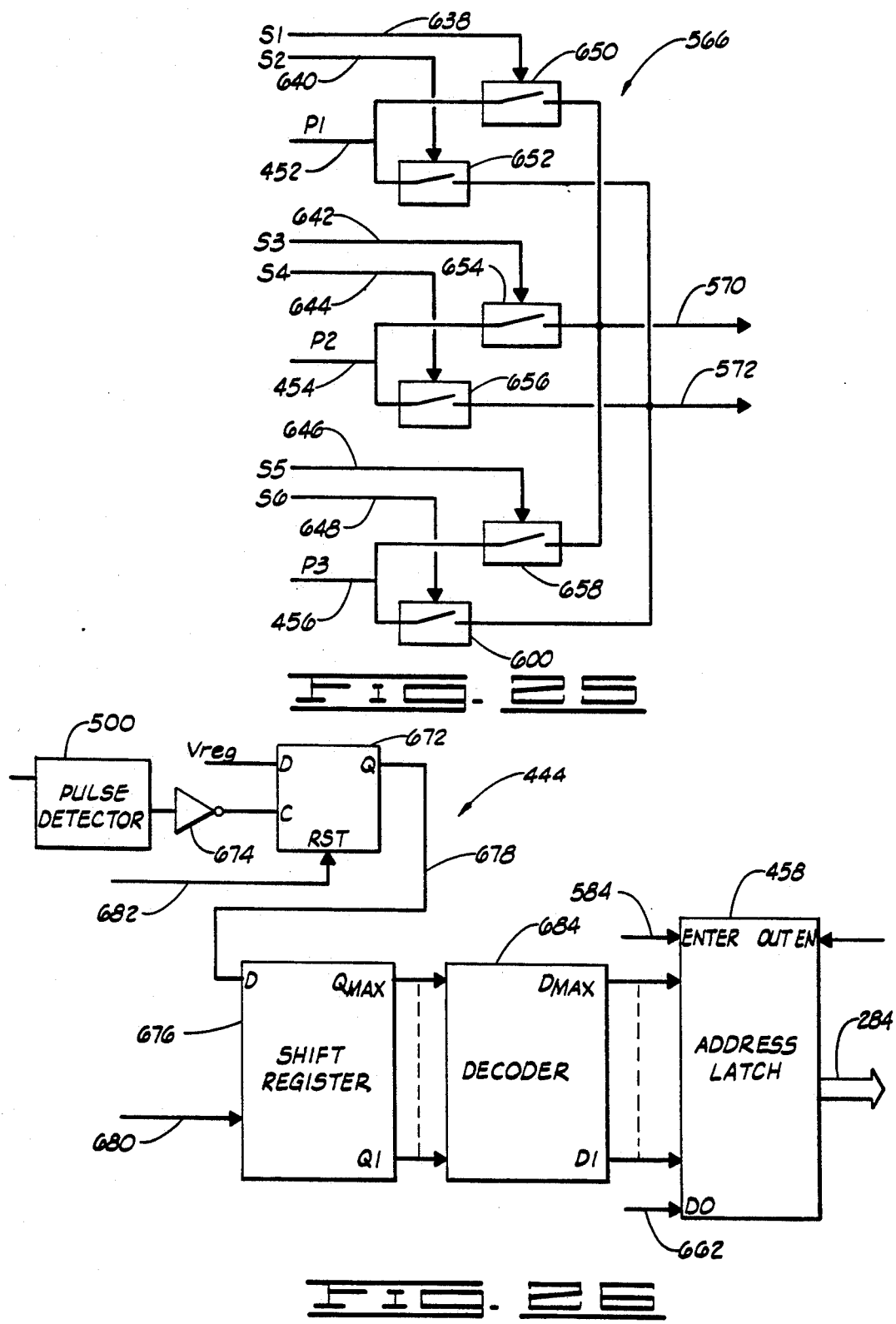

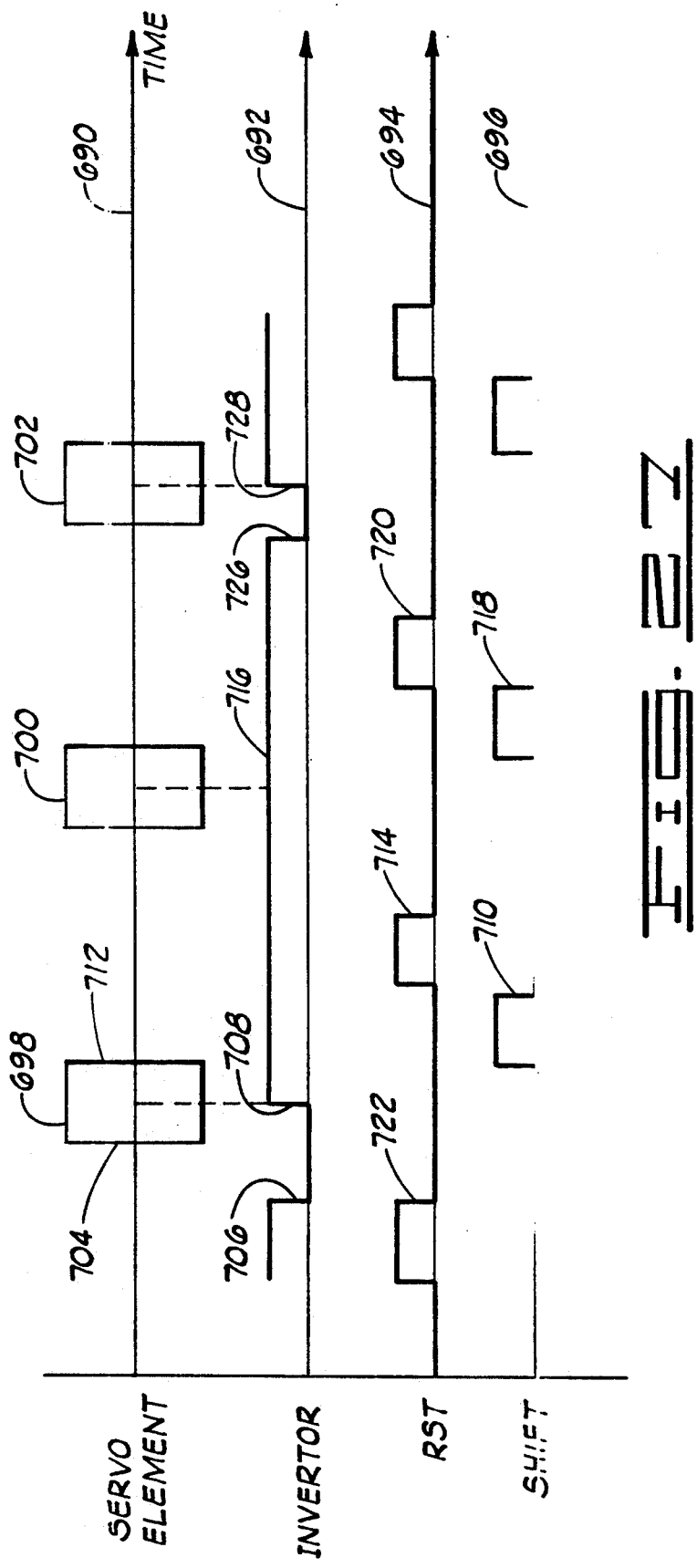

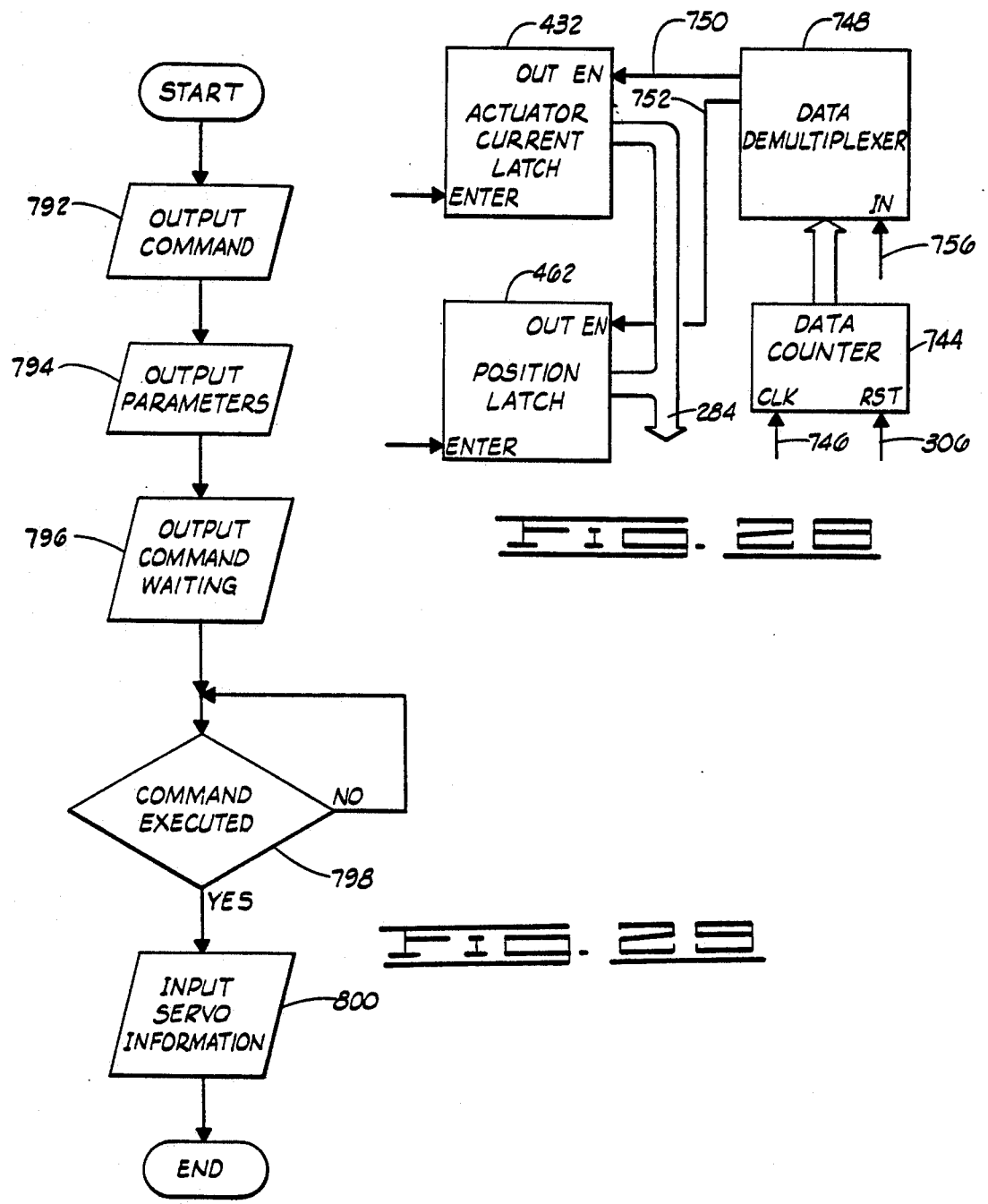

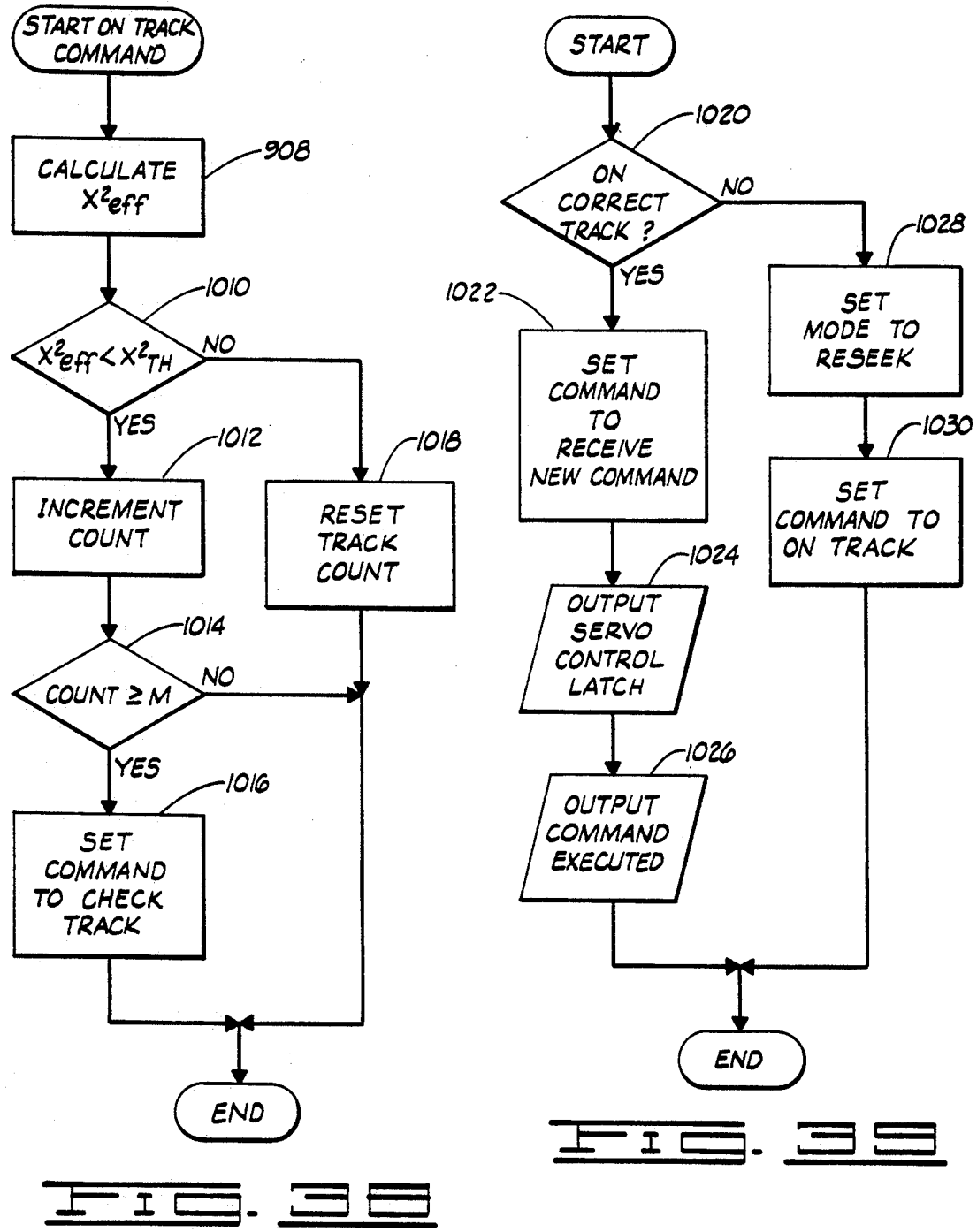

HARD DISC DRIVE WITH IMPROVED SERVO SYSTEM

BACKGROUND OF THE INVENTION

1. Field of the Invention

The present invention relates generally to improvements in hard disc drives and, more particularly but not by way of limitation, to improvements in methods and apparatus for acquiring and following data tracks defined on discs of a hard disc drive.

2. Brief Description of the Prior Art

In recent years, hard disc drives have increasingly become the device of choice for providing long term memory for small computers. Such drives generally provide a large data storage capacity within a small volume that facilitates mounting of the hard disc drive within the cabinet of the computer so that the computer can be constructed as a self-contained unit which provides the user with both the means for generating files and an on board storage capacity that is suitable for any purpose for which he may have purchased the computer. Moreover, modern hard disc drives are generally constructed to provide ready and rapid access to files that may have been previously stored or equally ready and rapid access to unused data storage locations for the storage of files the user creates. Indeed, storage capacities are currently expressed in gigabytes and average data track access times are expressed in milliseconds.

The large data capacity of a hard disc drive is achieved in several ways. Thus, for example, a hard disc drive will typically be comprised of a plurality of data storage discs having magnetizable surface coatings to which data files are written and a corresponding plurality of transducer heads that effect the writing and subsequent reading of the files. One approach to increasing data storage capacity is to increase the number of data storage discs included in the hard disc drive and an example of this approach is U.S. patent application Ser. No. 639,136 entitled "Apparatus and Method for Mounting Transducer Heads in a Hard Disk Drive" filed Jan. 9, 1991 by Cain et al. Such approach, however, will, in many cases, be limited by space requirements placed on a hard disc drive for mounting in a computer cabinet.

A second approach to increasing the data storage capacity of a hard disc drive is illustrated by recent improvements in the packing of data on the discs. In a hard disc drive, files are written to concentric data tracks that are defined on the surfaces of the discs and it has been recognized that the capacity of a disc drive can be maximized, consistently with minimization of errors upon writing and subsequent reading of the data, by writing the data at different rates at different radii of the heads on the disc. An example of this approach to data storage capacity maximization is described in U.S. Pat. No. 4,799,112, issued Jan. 17, 1989 to Bremmer et al.

A third approach to increasing disc drive data storage capacity, that with which the present invention is concerned, is to minimize the radial spacing of the data tracks. Such minimization is achieved by providing the hard disc drive with a servo system that reads servo information from the discs and continually repositions the locations of the transducer heads with respect to the data tracks on the discs.

In general, two types of servo systems are used. In an "embedded" system, the servo patterns are embedded in the data tracks so that a direct approach to track following is used. The problem with this direct approach is that it is wasteful of data storage capacity; either a large portion of the disc surfaces must be allocated to the servo system, to provide frequent sampling of the transducer head locations, or the data track spacing must be made large enough that any inaccuracy in the alignment between a transducer head and a track the head is following is within acceptable limits.

In the second type of servo system, an indirect approach to data track following is employed. One surface of one disc, a dedicated servo surface, is used solely for servo purposes and is written, during manufacture of the disc drive, with a servo pattern that repeats both radially and circumferentially across the dedicated servo surface. However, problems then arise with respect to alignment both of the servo head that reads the servo pattern and read/write heads that read and write data and with respect to the discs themselves. Without compensation for these misalignments, the data tracks must again be separated sufficiently that the read/write heads will follow the data tracks within acceptable limits.

Servo systems are further classified in accordance with the manner in which the servo circuit is realized. In an analog servo system, correction signals provided to a power amplifier that drives the actuator are developed, as the name indicates, in analog circuitry provided for the purpose An advantage of analog systems is that the servo pattern, which is digitally sampled, can be sampled at a rapid rate that enables close control of the transducer head locations during track following. A disadvantage is that the structure of an analog servo system is not readily modified so that limitations are placed on the incorporation of new developments; for example, adaptive track following techniques, in the disc drive art.

An alternative type of servo system is a digital servo system in which the sampled values are inputted to a microcomputer that calculates and outputs the correction signals. Such systems are readily modified, via re-programming of the microcomputer, so that digital servo systems have a potential for inclusion of substantially any technique that might permit higher track densities to be achieved in a hard disc drive.

Unfortunately, this potential has not been realized in prior art digital servo systems. Additional programming required, for example, to incorporate adaptive techniques into the servo system, can slow the operation of the microcomputer during track following to increase sampling times so that any increase in track density that might be gained by adopting a technique might be lost through an increase in servo pattern sampling time.

SUMMARY OF THE INVENTION

The present invention provides a hard disc drive including a digital servo system characterized by a flexibility that enables all of the advantages and capabilities of digital servo systems to be realized without the concomitant limitations of prior art servo systems. In part, such flexibility is achieved by a novel servo operation management system that provides the servo microcomputer with limited capabilities at any one time in which a selected servo operation is implemented to achieve speed of operation, but substantially unlimited capabilities over the extended period of time in which the disc drive is in operation. To this end, the servo microcomputer does not store information needed to carry out all of the servo operations of which the disc drive is capable nor all of the adaptive information that might be utilized to optimize track seeking or following. Rather, information needed only for the servo operation currently being carried out by the servo microcomputer is contained in memory and new information, to be used for a new operation, is transferred to the servo microcomputer memory along with a command to execute such operation. Such information can include adaptive data as well as coefficients for control equations used in the implementation of a servo operation so that substantially any adaptive technique that will enable closer track following, and consequent higher track densities, can be incorporated into the disc drive with no decrease in speed that would require a limitation on track densities. Thus, the present invention contemplates that the hard disc drive will be provided with a number of adaptive capabilities directed toward more accurate track following and, further, that other adaptive capabilities may be added at later times.

Accordingly, in one aspect of the present invention, a hard disc drive is provided with a system microcomputer which controls the operation of the disc drive as a whole and which stores, but does not execute, servo commands used to implement servo operations. Similarly, the system microcomputer stores, but does not make direct use of adaptive data and control equation coefficients that optimize and enable the carrying out of servo operations. Rather, the hard disc drive is further comprised of a servo microcomputer which carries out the servo commands using adaptive data and control equation coefficients that are transmitted to the servo microcomputer with the command to execute an operation.

A novel communications circuit between the two microcomputers is utilized for such transfer and a second aspect of the invention is the construction of such circuit to enable rapid transfer not only of commands and adaptive information to the servo microcomputer but information developed by the servo microcomputer to the system microcomputer. Thus, the communication circuit is provided with a command waiting latch that provides notice to the servo microcomputer that a new servo operation is to be carried out, a command latch that contains the operation, and a plurality of parameter latches that provide the information for executing the new operation. The command waiting latch can be read with a single input instruction so that no programming time need be utilized to input new commands or new parameters for executing those commands when no new command is to be carried out. At such times that a new servo operation is to be executed, the command and the parameters for the execution of the command are read by a series of input instructions and the communication circuit is comprised of a latch selection circuit that selects the command and parameter latches in turn so that the command and parameters can be rapidly transferred to the servo microcomputer by merely executing a series of input instructions. The communication circuit is further comprised of a plurality of information latches to which adaptive information, developed by the execution of servo operations by the servo microcomputer, can be rapidly outputted by a series of output commands in which the information latches are similarly selected by the latch selection circuit. Thus, on start-up of the hard disc drive of the present invention, commands directed toward the gathering of adaptive information used in servo operations can be executed by the servo microprocessor and the adaptive data can then be stored in the system microcomputer for use when such operations are carried out.

In the hard disc drive of the present invention, servo information is written to a dedicated servo surface in a series of consecutive frames on concentric tracks and each frame contains a track address field to which addresses for the servo tracks are written and a position field that provides an indication of the location of the servo head with respect to servo tracks. In another aspect of the invention, the position field contains a novel pattern of position elements which enables the servo microcomputer to select either of two fine control regions about each data track for measurement, with the track addresses, of the servo head location. Thus, during track seeking, a limited fine control region extending to the midpoints between adjacent tracks is selected to provide unambiguous servo head radial location data for determination of servo head velocity used in generating correction signals to implement track seeking in accordance with a velocity demand profile. Conversely, during track following, an extended fine control region, extending to the tracks to either side of the track being followed, enables the track density to be maximized, in part, by minimizing the possible track loss resulting from mechanical shock to which the hard disc drive might be subjected and, in part, by enabling the servo head to be displaced well over a half track spacing from a track on the dedicated servo surface to cause a read/write head to follow a track on a data surface. Thus, misalignment between servo and read/write heads and misalignment between tracks on the dedicated servo surface and tracks on the data surfaces can be fully compensated. The selection between the two fine control regions is effected by outputting a selection bit to a novel servo control latch of which the servo system is comprised.

In yet another aspect of the invention, novel methods are implemented in the operation of the servo system. Thus, the present invention contemplates the generation of a track phase code from the position fields of the servo frames from the position field servo elements to enable correction of track addresses should bits of the track address be misread. Such correction eliminates incorrect servo head speed measurements during track seeking to enable minimization of seek time while minimizing the possibility that the seek will end at a track other than the destination track.

An important object of the present invention is to provide a hard disc drive in which data storage capacity can be maximized by increasing track density without loss of track following capability.

Another object of the present invention is to provide a hard disc drive characterized by flexibility in the implementation of adaptive features that can be implemented to maximize data track density without loss of sampling speed that will maximize accuracy of track following.

Still another object of the present invention is to provide a hard disc drive that can be inexpensively adapted to future developments in the disc drive art.

A further object of the invention is to provide a hard disc drive in which each of a plurality of servo operations can be independently optimized.

Yet another object of the invention is to facilitate upgrading of hard disc drives in the field.

Other objects, features and advantages of the present invention will become apparent from the following detailed description when read in conjunction with the drawings and appended claims.

BRIEF DESCRIPTION OF THE DRAWINGS

FIG. 3 is a diagram of the AGC and sync fields of the servo frame.

FIG. 4 is a diagram of portions of the address field of the servo frame.

FIG. 16 is a graph illustrating the form of an emf pulse induced in the servo head by passage of a servo element.

FIG. 17 is a block diagram of the timing circuit of FIG. 14.

FIG. 18 is a schematic circuit diagram of a peak height detector of the servo data recovery circuit.

FIG. 19 is a block diagram of the position circuit of FIG. 14.

FIG. 23 is a block diagram of the switch selection circuit of FIG. 19.

FIG. 24 is a graph illustrating the outputs of the comparators of FIG. 23 in relation to data track address.

FIG. 25 is a schematic diagram of the switch circuit of FIG. 19.

FIG. 26 is a block diagram of the address circuit of FIG. 14.

FIG. 27 is a timing diagram for the address circuit.

FIG. 28 is a block diagram of the combined servo data latch.

FIG. 29 is a flow chart for a command block routine of the system microcomputer.

FIG. 36 is a flow chart for high velocity seek mode routine.

FIG. 38 is a flow chart for the on track command routine.

FIG. 39 is a flow chart for the check track command routine.

DESCRIPTION OF THE DISC DRIVE

Figure 1:
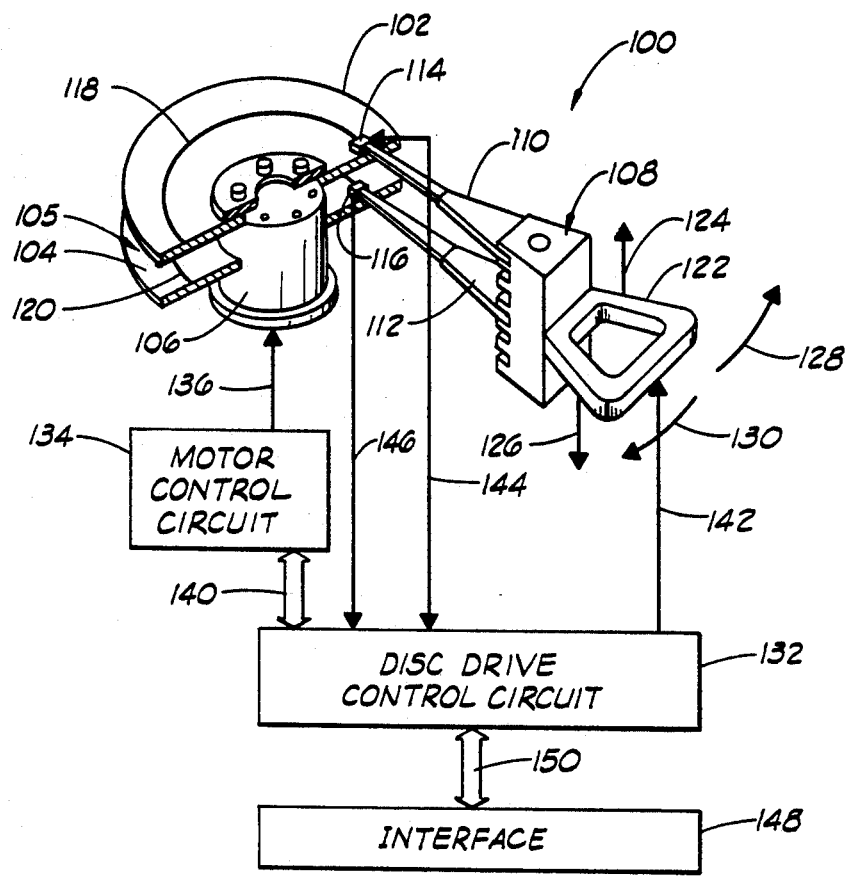
FIG. 1 is a schematic diagram of a hard disk drive circuit incorporating the digital servo system of the present invention.

Referring now to the drawings in general and to FIG. 1 in particular, shown therein and designated by the general reference numeral 100 is a hard disc drive constructed in accordance with the present invention. As shown therein, the hard disc drive 100 is generally comprised of a plurality of discs, two of which have been illustrated in FIG. 1 and designated 102 and 104 therein, that are mounted on the rotor of a spindle motor 106 for rotation of the discs 102, 104 about a common axis. Adjacent the discs 102, is an electromechanical actuator 108 upon which are mounted a plurality of transducer head support arms, two of which have been illustrated in FIG. 1 and designated by the reference numerals 110 and 112 therein. The actuator 108 is pivotally mounted on a housing (not shown) that also supports the spindle motor 106 and the transducer head support arms extend into the disc stack to support transducer heads, which may be of the type generally referred to as Winchester heads, adjacent the disc surfaces. During operation of the hard disc drive, the discs are rotated and air swirled by the discs lift the transducer heads slightly away from the disc surfaces so that the heads "fly" over the surfaces in close proximity thereto.

Two transducer heads, 114 and 116 have been illustrated in FIG. 1; however, as is known to those skilled in the art, the disc drive 100 will generally comprise one transducer head for each surface of each disc of the drive 100. As is further known to those of skill in the art, the discs 102, 104 have magnetizable surface coatings and the transducer heads are constructed to magnetize such coatings to write data to the discs 102, 104 to subsequently read data from the discs in a read mode of operation of the hard disc drive 100. More specifically, writing is effected by magnetizing portions of concentric tracks, such as the tracks 118 and 120, defined on the discs in a manner to be described below, in one or the other of two opposite circumferential directions and reading is effected by detecting electromotive force pulses induced in the transducer heads as transitions between oppositely magnetized sections of the tracks pas by the transducer heads. In the practice of the present invention, one disc surface is selected as a dedicated servo surface to which servo information is written at the time the hard disk drive is manufactured and the transducer head adjacent thereto is similarly selected as a servo head. For purposes of illustration, it will be assumed herein that the dedicated servo surface is the upper surface 105 of disc 104 and, accordingly, the transducer head 116 will be referred to herein as the servo head 116.

The actuator 108 is further comprised of an actuator coil 122, mounted on the end of the actuator 108 opposite the support arms 110, 112, and the hard disc drive is further comprised of a magnet assembly (not shown) that is mounted about the coil 122 to produce a magnetic field, having oppositely directed portions indicated by the arrows 124, 126 in FIG. 1, in which the sides of the coil are immersed. Thus, the actuator 108 can be pivoted in the direction 128, to move the transducers heads 114 and 116 radially inwardly along the surfaces of the discs 102 and 104, by passing a current through the actuator coil 122 in one direction, and pivoted in the opposite direction 130, to move the transducer heads radially outwardly, by passing a current through the actuator coil in the opposite direction. Thus, as will be discussed below, any track on the discs of the hard disc drive can by accessed and followed for the writing or reading of data. (As is known in the art, the dedicated surface is written only during manufacture of the disc drive and suitable locks are provided to prevent writing to such surface by the user.)

It is further contemplated that the hard disc drive 100 will be comprised of an actuator latch assembly (not shown) that locks the actuator in a fixed position wherein the transducer heads are positioned over a landing zone in radially inward portions of the discs at such times that the hard disc drive is not operating. During operation, the actuator latch is released by an electrical signal provided thereto in a manner to be noted below. A suitable latch assembly for the hard disc drive 100 has been described in U.S. patent application Ser. No. 711,311 filed Jun. 6, 1991 by Blanks entitled "Self-Holding Latch Assembly" and incorporated by reference herein.

Figure 6:
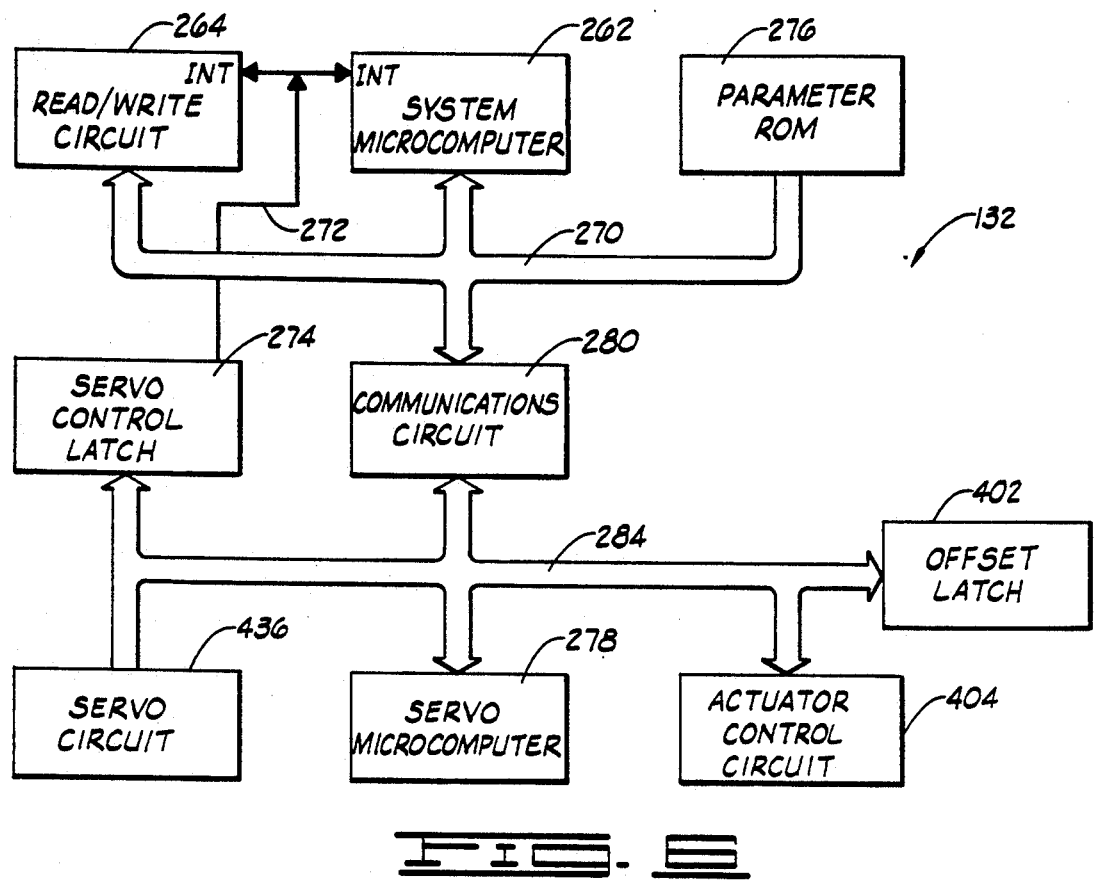
FIG. 6 is a block diagram of the disc drive control circuit.

Continuing with FIG. 1, the hard disc drive 100 is further comprised of a disc drive control circuit 132, illustrated in FIG. 6, that controls the operation of the motor 106 and the actuator 108. More particularly, the spindle motor 106 is operated at a carefully controlled speed, as is conventional in the art, via electrical power supplied from a speed control circuit 134 on a conducting path 136. A suitable speed control circuit for use in the present invention has been described in U.S. patent application Ser. No. 693,356 filed Apr. 30 1991 by Genheimer et al. and entitled "Motor Construction & Method for Limiting Spinup Time in a Hard Disc Drive", the teachings of which are hereby incorporated by reference. The actuator coil is provided with a current, in either of two directions, via conductors indicated by the conduction path 142.

The writing to the upper surface of disc 102, and the subsequent reading of data therefrom, is effected by signals provided to the transducer head 114, also referred to herein as a read/write head 114, from the disc drive control circuit 132 on a conducting path 144 and conducting paths (not shown) are similarly provided to other transducer heads (not shown) that write and read data to and from other disc surfaces. Similarly, the servo head 116 transmits servo signals generated by passage of servo information written to the dedicated servo surface to the disc drive control circuit 132 via a conducting path 146. Connection of the hard disc drive 100 to a host computer (not shown) is made via a standard interface 148 that, as is conventional, provides a variety of signals to the disc drive control circuit 132 as indicated by the bus 150. For purposes of discussion, the interface 148 will be considered herein to include such circuitry as buffers that receive data to be stored by the disc drive 100, a power supply that receives electrical power from the host computer and provides regulated power at selected voltage levels to remaining portions of the disc drive, and clocks used in the operation of the disc drive as will be discussed below. All such circuitry is conventional and need not be further discussed for purposes of disclosing the invention.

Before discussing the disc drive control circuit, it will be useful to first consider the formatting of the dedicated servo surface and FIGS. 2 through 5 have been provided for this purpose.

Figure 2:
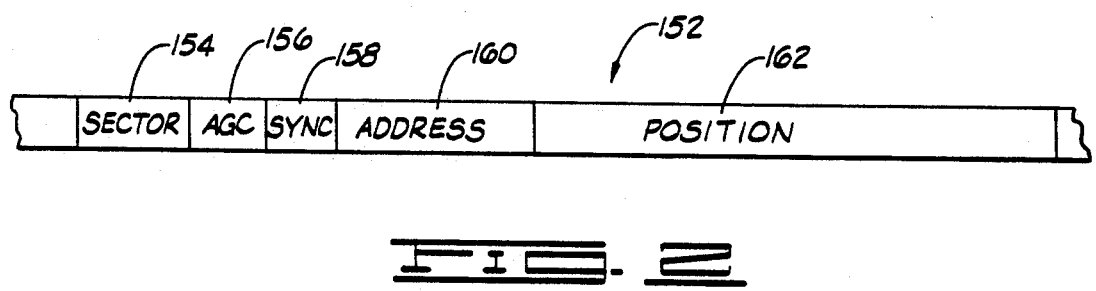
FIG. 2 is a diagram of a frame of the servo pattern written to the dedicated servo surface of one disc of the hard disc drive of FIG. 1.
Figure 5:
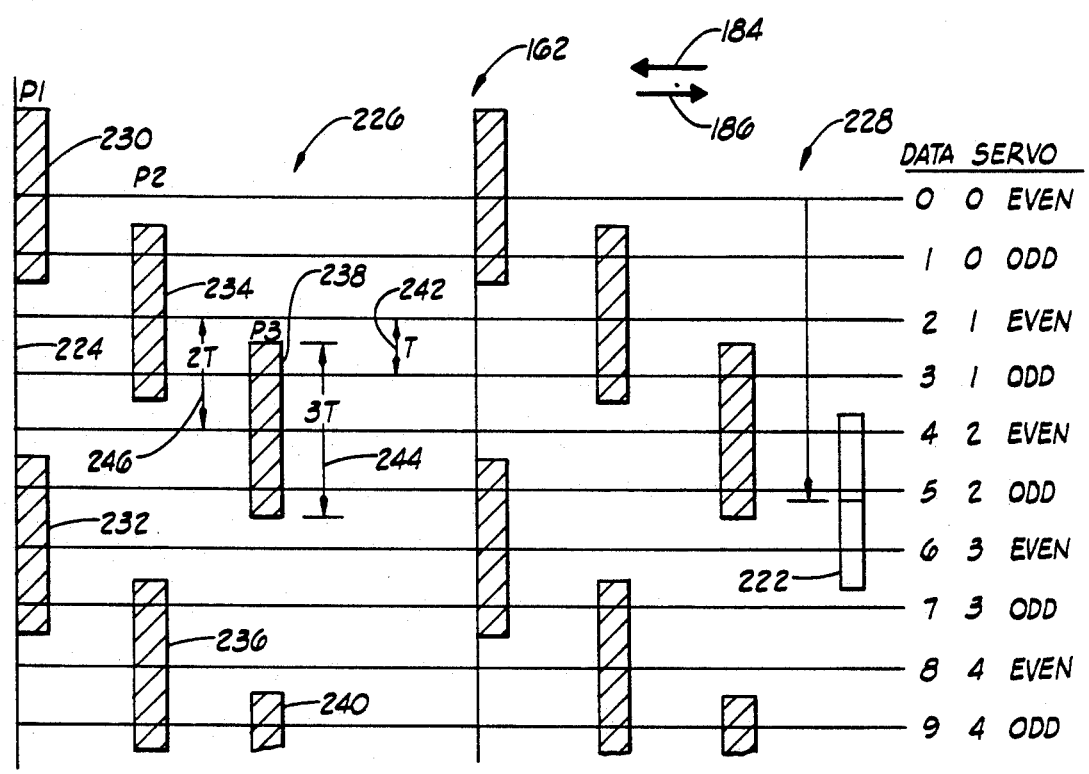
FIG. 5 is a diagram of portions of the position field of the servo frame.

Referring to FIG. 2, the tracks on the dedicated servo surface are each divided into an integral number of consecutive, circumferentially extending frames, one of which has been illustrated and designated by the numeral 152 in FIG. 2, that each pass by the servo head 116 in a preselected frame time during operation of the hard disc drive 100. (As noted above, the speed of the spindle motor 106 is maintained constant during operation of the hard disc drive 100 so that distances along the tracks 118, 120 correspond to time intervals.) Each frame is, in turn, divided into a plurality of fields containing specific types of servo information, written as a pattern of servo elements, or dibits, for specific purposes. Specifically, the frame 152 is comprised of: a sector field 154, which defines an index tim used in spindle motor speed control; an AGC field 156; a sync field 158, used to effect timing of the operation of a servo circuit to be discussed below; an address field 160, which contains dibits identifying every other track on the discs; and a position field, which, with the track addresses, provides the precise radial location of the servo head on the discs. The structures of the AGC, sync, address and position fields are shown in FIGS. 3 through 5; the structure of the sector field has been described in U.S. patent application Ser. No. 560,438 entitled "Error Tolerant Multi-Frame Index Generation Scheme", filed Jul. 31, 1990 by Miller and incorporated herein by reference. Accordingly, the sector field need not be further discussed herein.

As is conventional in the art, servo tracks on the dedicated servo surface and data tracks on data disc surfaces are organized into cylinders each comprising a servo track and a plurality of data tracks that are substantially axially aligned with the servo track. Thus, seeking of data tracks and following such tracks can be effected by seeking to a servo track in the same cylinder and subsequently following the servo track.

Referring to FIG. 3, the AGC field is comprised of a plurality of AGC dibits 176, 178, 180 and 182 that are formed by magnetizing the dedicated servo surface in one direction; for example, the direction indicated by the arrow 184 in FIG. 3 and magnetizing the dibits 176, 178, 180, and 182 in the opposite direction 186. As indicated in FIG. 3, by servo tracks 188, 190, 192, 194, 196, 198 and 200, the AGC dibits are written to every servo track on the dedicated servo surface to extend substantially from the inside edge of the disc 104 to the outside edge thereof. The AGC dibits are longitudinally spaced by substantially thrice their widths for a purpose to be discussed below.

Also shown in FIG. 3 is the sync field 158. Such field is comprised of dibits 202, 204, 206, 208 and 210 that, like the AGC dibits, are written to each of the servo tracks on the dedicated servo surface. The dibits are spaced by a distance that is equal to their widths, a spacing that is not found in any of the remaining fields of the frame 152, for a purpose to be described below.

Terminal portions of the address field 160, for tracks near the outside edge of the disc 104, have been illustrated in FIG. 4. As indicated therein, tracks defined on the dedicated servo surface are numbered consecutively from the outermost track, 212 in FIG. 4, using a double numbering scheme. More particularly, each track is assigned a "Data" numerical designation in which the track numbers begin with zero for the track 212 and increase in normal counting order toward the center of the disc 104. Each data track is contained in a cylinder that also includes a data track on a data surface on which computer files are stored. Additionally, each track is given a "Servo" designation in which consecutive pairs of tracks are given the same numerical designations and an even or odd designation. Thus, the track 212 and the next track 214 are both "0" servo tracks that are distinguished on the basis that the track 212 is an "even" servo track while the track 214 is an "odd" servo track. Remaining tracks are similarly assigned servo track numbers in succession toward the center of the disc 104 as indicated at the right hand side of the drawing.

Servo track addresses are written to the dedicated servo surface by selectively magnetizing portions of radially extending, spaced strips, each corresponding to a servo track address bit, in the direction 186 opposite the background direction 184 of magnetization of the servo surface. (As in FIG. 3, portions of the dedicated servo surface magnetized in the direction 186 are indicated by solid, shaded blocks.) More particularly, the least significant bit of the track address is written along a radial strip indicated in dashed lines at 215; the bit of next highest significance is written along the strip 216 displaced toward the leading edge of the address field; and so on to a strip (not shown) for the most significant bit of the track address.

In the practice of the invention, the servo track addresses are expressed in a Grey code in which only one bit of the address changes from one track to the next. Thus, the pattern of blocks magnetized in the direction 184 for the least significant bit of the servo track addresses exhibit a pattern 011001100110 . . . , where 0 indicates magnetization in the direction 184 and 1 in the direction 186, for increasing servo track numbers as indicated by the blocks 216, 218 and 220 in FIG. 4. Similar, known, patterns exist for remaining bits of the Grey code addresses. It will also be noticed that each block of a track address bit begins substantially one half track spacing before the first even servo track within the block and ends one half track spacing after the last odd servo track within the block. Thus, for example, the block 216 that expresses the least significant bit of servo tracks 1 even, 1 odd, 2 even and 2 odd begins a half track spacing before track 1 even and ends one half track spacing after track 2 odd. The significance of this point will become clear below.

Also shown in FIG. 4, at 222, is a projection of the flux gap in the servo head 116 on the dedicated servo surface. As indicated by the projection 222, the data tracks are spaced such that the flux gap of the servo head 116 extends a radial distance of three track spacings.

Turning now to FIG. 5, the position field 162 begins at a radius indicated in FIGS. 4 and 5 by the line 224 and is comprised of a plurality of identical position subfields, two of which have been indicated at 226 and 228 in the drawing. Each subfield is comprised of three radially extending, circumferentially spaced series of position servo elements magnetized in the direction 186 with the position servo elements for each series displaced radially from the servo elements of the previous series. Thus, the position subfield 226 comprises: a series of first position servo elements (also referred to as P1 elements), two of which have been indicated at 230 and 232; a series of second position servo elements (also referred to as P2 elements), two of which have been indicated at 234 and 236; and a series of third position servo elements (also referred to as P3 elements), two of which have been indicated at 238 and 240.

In the practice of the invention, each position servo element has a radial width of three data track spacings and elements of each type, P1, P2 and P3, are radially spaced a distance of three data track spacings. (As in FIG. 4, the portion of the position field illustrated extends from the outermost track on the dedicate servo surface and data and servo track numbers have been indicated at the right side of FIG. 5.) Further, each position servo element is centered on an even servo track and position servo elements of successive types are radially displaced by one servo track; that is, two data track, spacings. Thus, the P1 dibits are centered on servo tracks 0 even, 3 even, 6 even, . . . ; the P2 dibits are centered on servo tracks 1 even, 4 even, 7 even, . . . ; and the P3 dibits are centered on servo tracks 2 even, 5 even, 8 even, . . . This geometry has been indicated by labeling an arrow 242, between data tracks 2 and 3, with the letter T to indicate one data track spacing and labeling arrows 244 and 246, for the radial width of the dibit 238 and the radial offset of dibit 238 from dibit 234 respectively, as 3T and 2T. The data and servo tracks are defined during manufacture of the hard disc drive 100 by rotating the disc 104 and stepping the servo head 116 across the dedicated servo surface in one servo track increments while writing each of the P1, P2 and P3 dibits in the subfields at times corresponding to circumferential positions of the position dibits in the subfields of the position field. Also shown in FIG. 5 is the projection 222 of the servo head 116 flux gap on the portion of the position field illustrated in such drawing.

DESCRIPTION OF THE DISC DRIVE CONTROL CIRCUIT

Referring Now to FIG. 6, shown therein is a block diagram of the disc Drive control circuit 132. In general, the circuit is comprised of a system microcomputer 262 which communicates with the host computer in a conventional manner and is programmed to control the general operation of the hard disc drive 100. Thus, the system microcomputer receives instructions to read or write data and determines the disc and data track thereon that is to receive, or provide, the data and, at a general level, manages the movement of the read/write heads to such data track. Once the selected track has been accessed, the data is transferred from the interface 148 to the read/write heads by a conventional read/write circuit 264 in accordance with commands received from the system microcomputer 262 via the system microcomputer data bus 270.

The read/write circuit 264 is conventional and the system microcomputer 262 can be any suitable microcomputer; for example, microcomputers that have been used in prior art, so that they need not be discussed in detail for purposes of the present disclosure. Rather, it will suffice to point out features of the system microcomputer 262 and the read/write circuit 264 that relate to the present invention. One such feature is an interrupt capability of the system microprocessor and a corresponding write interrupt characteristic of the read/write circuit 264. The present invention contemplates that the read/write circuit 264 can carry out the writing of data to a disc only in response to an on track signal received on a conducting path 272 from a servo control latch 274 of which the disc drive control circuit 132 is further comprised and, further, that if such signal is discontinued during writing, writing will not be recommenced without further commands from the system microprocessor 262. The on track signal is also transmitted to an interrupt terminal of the system microcomputer 262 and such microcomputer is programmed to interrupt whatever routine it may currently be running if the on track signal is discontinued while writing of data is taking place.

The present invention contemplates that the system microcomputer 262 will have one further characteristic; specifically, its memory includes a parameter ROM 276 that is implemented in a package that is separate from remaining portions of the system microcomputer 262 memory. The function of the parameter ROM and the purpose for maintaining portions of the memory of the system microcomputer 262 in a separate package will be discussed below.

In the hard disc drive 100, servo operations are directly controlled by a servo microcomputer 278 using parameters, such as control equation coefficients, that are received along with servo commands from the system microcomputer 262 via a communications circuit 280 and the data buses, 270 and 284, of the system microcomputer 262 and the servo microcomputer 278 respectively. As will be discussed below, the present invention further contemplates that servo operations will be carried out on a time schedule defined by the time required for a servo frame to pass the servo head 116. For example, if the servo head 116 is following a data track using a velocity demand profile, as is conventional in the art, information necessary to determine the speed of the servo surface across the dedicated servo surface and to determine and output an appropriate actuator current will occur during passage of one frame. Such time, accordingly, provides a sampling interval for obtaining data from the servo head 116. Since the servo circuit is open loop between successive samples, such time is made short by an operations management method to be discussed below. However, it is worth noting at present that such method contemplates that, during the seek, control parameters necessary for settling the servo head 116 on the destination track and, subsequently, following such track need not be in the memory of the servo microcomputer 278 while the seek takes place. Rather, the operations management method to be discussed below provides for the transfer of such parameters as needed from the systems microcomputer 262.

Figure 7:
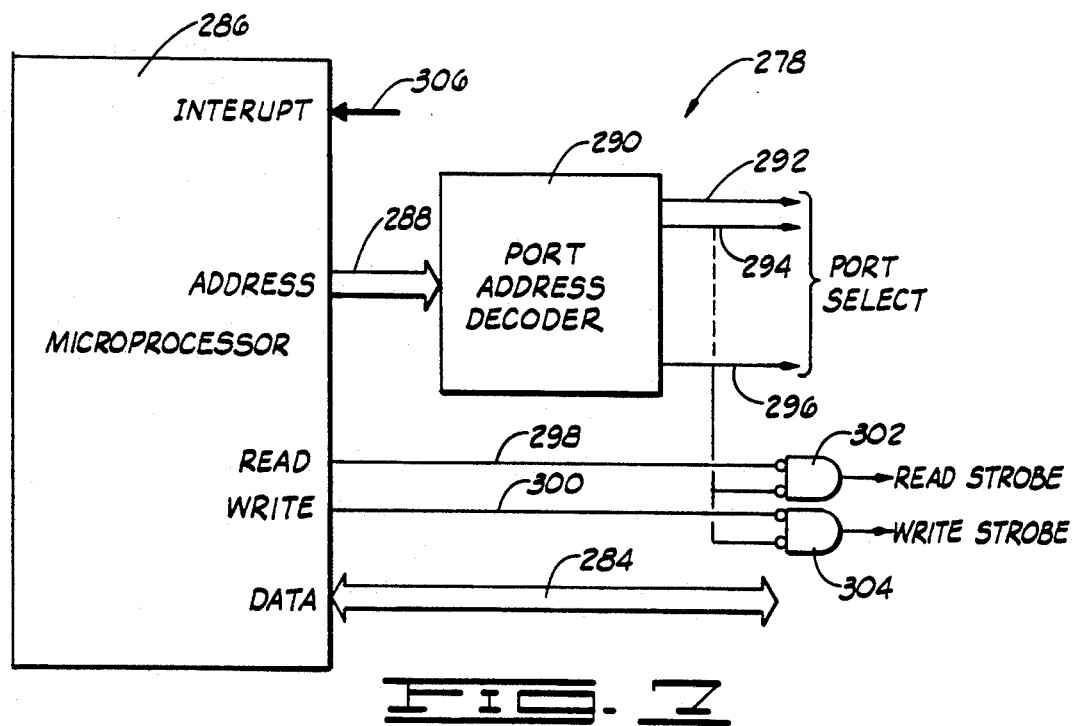
FIG. 7 is a block diagram of the servo microcomputer shown in FIG. 6.

The elimination of control parameters other than those needed for the servo operation currently being executed permits the use of a microprocessor, indicated at 286 in FIG. 7, that is operable in a microcomputer mode using only on-chip memory, for the servo microcomputer 278. Thus, the speed of operation of the servo microcomputer 278 can be optimized at a reasonable cost to the user of hard disc drives. Specifically, no input or output of control parameters need be carried out to execute a servo operation and the memory of the microprocessor used for the servo microcomputer 278 need not be large. A microprocessor which has been found suitable for the servo microcomputer 278 is the TMS320C15 manufactured by Texas Instruments of Dallas, Tex. Such microprocessor has on-chip ROM that can contain 4096 sixteen bit words, used in the present invention to store selected tables and selected servo operation routines, and on-chip RAM that can contain 256 sixteen bit words. These words in RAM are used in the present invention to store servo parameters and measured quantities used to determine correction and control signals provided to the actuator coil 122 and motor control circuit 134.

For purposes of providing a clear understanding of the invention, it will be useful to describe the servo microcomputer 278 in terms of the characteristics of the aforementioned TMS320C15 microprocessor. However, it will be recognized that such description is solely for purposes of illustration and should not be considered in any way limiting on the scope of the invention.

With this note in mind, FIG. 7 has been provided to illustrate pertinent features of the microprocessor, indicated at 286, used in the implementation of the invention and it will be assumed that the microprocessor 286 shown therein is the aforementioned TMS320C15. As described in the manufacturer's literature for such device, the microprocessor 286 can address eight I/O ports connected to the microprocessor data bus, which has been numbered 284 consistently with the numbering of the servo microcomputer bus in FIG. 6. These ports are defined on three bits of an address bus 288 that leads to a conventional port address decoder 290, available from the manufacturer of the TMS320C15 microprocessor, that responds to the port address on bus 288 by providing a port select signal on one of eight conducting paths, three of which have been indicated at 292, 294 and 296 in FIG. 7. Such signals are expressed in negative logic so that a low voltage at one of the conducting paths constitutes a port select signal that is to be used in I/O instructions.

The port select signals are converted into read and write strobes by AND gates, having inverting inputs, that each receive one port select signal and either a read or a write signal, also expressed in negative logic, from read and write terminals of the microprocessor on conducting paths 298 and 300 respectively from the microprocessor. A pair of AND gates is provided for each I/O port and one pair, AND gates 302 and 304, associated with the I/O port that is selected by a signal on conducting path 296 has been shown in FIG. 7. Data is inputted or outputted in the conventional manner; that is, a device that is to receive, or provide, data from, or to, the microprocessor 286 is assigned a port address and data terminals of the device are connected to the data bus 284 so the data can be transferred by a read or write strobe from the AND gate that is selected by the port address. For purposes of discussion, the port addresses will be referred to herein by names indicative of the data that is transferred. Thus, for example, the servo control latch 274 will be described as receiving servo control information on the servo control output port.

One further feature of the microprocessor needs to be noted. The present invention contemplates that majority of servo operations will be carried out by programming that is addressed via an interrupt received on a conducting path 306 in FIG. 7. The microprocessor 286 will, of course, have other terminals but such terminals need not be considered for a teaching of the invention. Such terminals have conventional functions which are described in the manufacturer's literature of the particular microprocessor that is used in a circuit.

Figure 8:
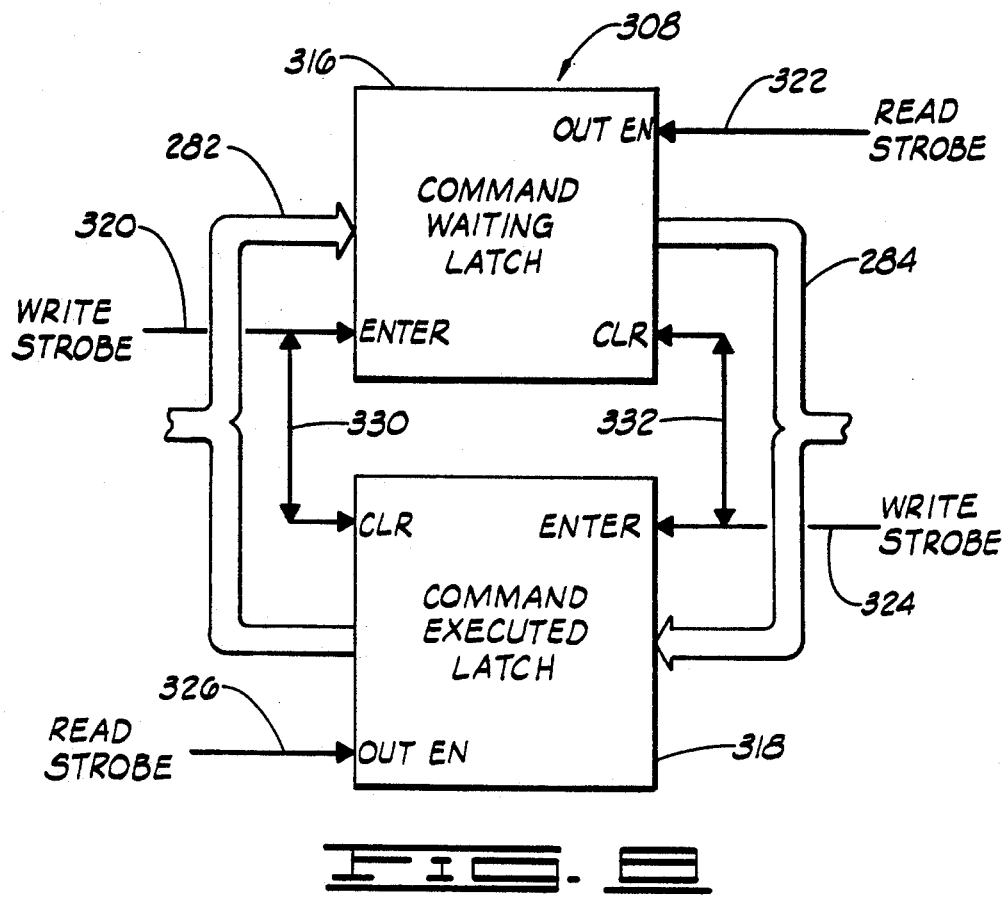
FIG. 8 through 11 are block diagrams illustrating the construction of the communications circuit shown in FIG. 6.

With this background, it will be useful to now consider the construction of the communications circuit 280. In general, the communications circuit 280 comprises: a command status circuit 308 shown in FIG. 8, a latch selection circuit 310 shown in FIG. 9; a command register 312 shown in FIG. 10, and a servo information register 314 shown in FIG. 12. Referring first to FIG. 8, the command status circuit 308 is comprised of two latches, a command waiting latch 316 and a command executed latch 318, that are used by the system and servo microcomputers, 262 and 274, to indicate that information from one is available to the other. Thus, the command waiting latch 316 has data input terminals connected to the data bus 282 of the system microprocessor 262 for entry of a data word that indicates that the system microprocessor 262 has a command waiting for the servo microcomputer 278 in response to a write strobe issued on a conducting path 320 to an enter terminal of the latch 316 by the system microcomputer 262. The latch 316 is read, at selected times to be discussed below, at a command waiting port of the servo microcomputer 274 via connection of the data output terminals of the latch 316 to the data bus 284 of the servo microcomputer 278 and reception of a read strobe on a conducting path 322. The command executed latch 318 is connected between the buses 282 and 284 in the opposite manner to provide an indication from the servo microcomputer 274 to the system microcomputer 262 that a command has been executed. Such indication, provided at a command executed port, may also include error data that indicates the nature of any malfunction that may have occurred in the execution of a servo operation. Thus, the latch 318 receives a write strobe on a conducting path 324 from the servo microcomputer 274 and, subsequently, a read strobe on conducting path 326 from the system microprocessor 262. A conducting path 330 transmits the write strobe from the system microcomputer 262 to a clear terminal of the latch 318 and a conducting path 332 similarly transmits the write strobe on conducting path 324 to a clear terminal of latch 316 so that issuance of a new command by the system microcomputer clears the acknowledgement that the last command has been executed from the latch 318 and the entry of a new acknowledgement clears the indication that a command is waiting from the latch 316. The system microcomputer 262 is programmed to withhold new commands until the previous command has been executed and the servo microcomputer 378 is programmed to input the contents of the latch 316, to determine whether a new command has been issued, only at selected times that will be discussed below.

Figure 9:
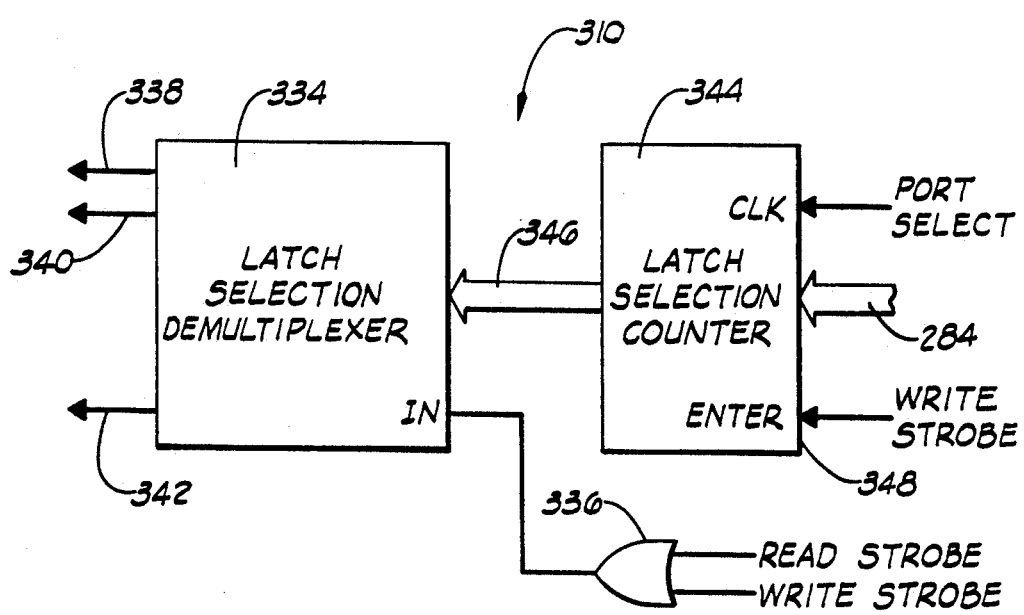

Referring to FIG. 9, the latch selection circuit 310 is comprised of a latch selection demultiplexer 334 that receives both read and write strobes for entry of data, as will be discussed below, into the servo microcomputer at a command and parameter input port and for writing of data from a parameter output port. For a purpose that will become clear below, both of these ports are assigned the same numerical address that is transmitted to the port address decoder to generate a port select signal. The read and write strobes are received by an OR gate 336, connected to the input terminal of the latch selection demultiplexer 334, and are transmitted by the latch selection demultiplexer 334 to a selected conducting path, three of which have been illustrated and indicated by the reference numbers 338, 340 and 342 in FIG. 9, that is selected by a latch selection counter 344 via a bus 346 from the counter output terminals to select terminals of the demultiplexer 334. The latch selection counter 344 has input terminals connected to the data bus 284 of the servo microcomputer 278 so that any of the conducting paths 338, 340, 342 can be used to transmit a read or write strobe by first entering an address indicating the conducting path into the counter 344 via a latch select port and a write strobe received by the counter on a conducting path 348. The counter clock terminal is connected to the terminal of the port address decoder 290 that identifies both the command and parameter input port and the servo information output port so that, each time data is inputted or outputted on either of these ports, the counter 344 is incremented. Thus, a series of input or output instructions on the command and parameter input port or servo information port can be used to input the contents of any one of a consecutive series of latches or output to any one of a consecutive series of latches.

Figure 10:
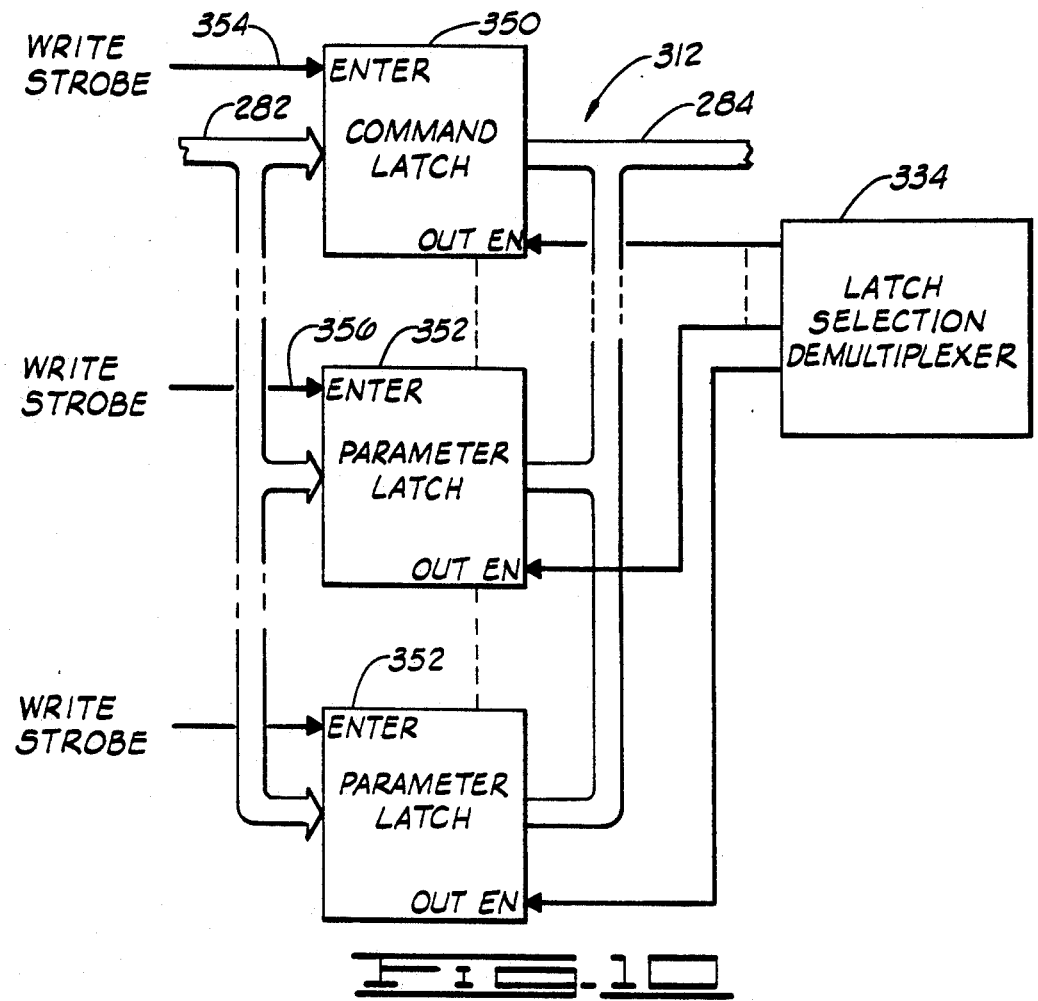

Inputting of the contents of a plurality of latches by the servo microcomputer 278 by repeatedly issuing the same input instruction is used to obtain commands and parameters needed to execute those commands from the system microcomputer 262. Referring to FIG. 10, selected outputs of the latch selection demultiplexer 334 are connected to the output enable terminal of a command latch 350 and a plurality of parameter latches 352, two of which have been shown in FIG. 10. The data outputs of the latches 350, 352 are connected to the data bus 284 of the servo microcomputer 278 and the data inputs of such latches are similarly connected to the data bus 282 of system microcomputer 262. Appropriate write strobes are provided to the latches 350, 352 from the system microcomputer 262 on conducting paths 354, 356 so that a command can be issued to the servo microcomputer by entering the command in the command latch 350 and entering the parameters in the parameter latches 352. The command and the parameters are then read by the servo microcomputer 274 by issuing a series of input commands to the command and parameter input port after having first outputted to the counter 344 the identification of the command latch 350. It will also be noted that the command register 312 can also be used to input data other than commands and parameters to the servo microcomputer 278. Specifically, since the contents of the counter 344 are entered from the servo microcomputer 278 before inputting data from a series of latches of the command register 312, additional latches can be connected to outputs of the latch selection demultiplexer 334 and inputted by first outputting the identification of such latch to the counter 344.

Figure 11:
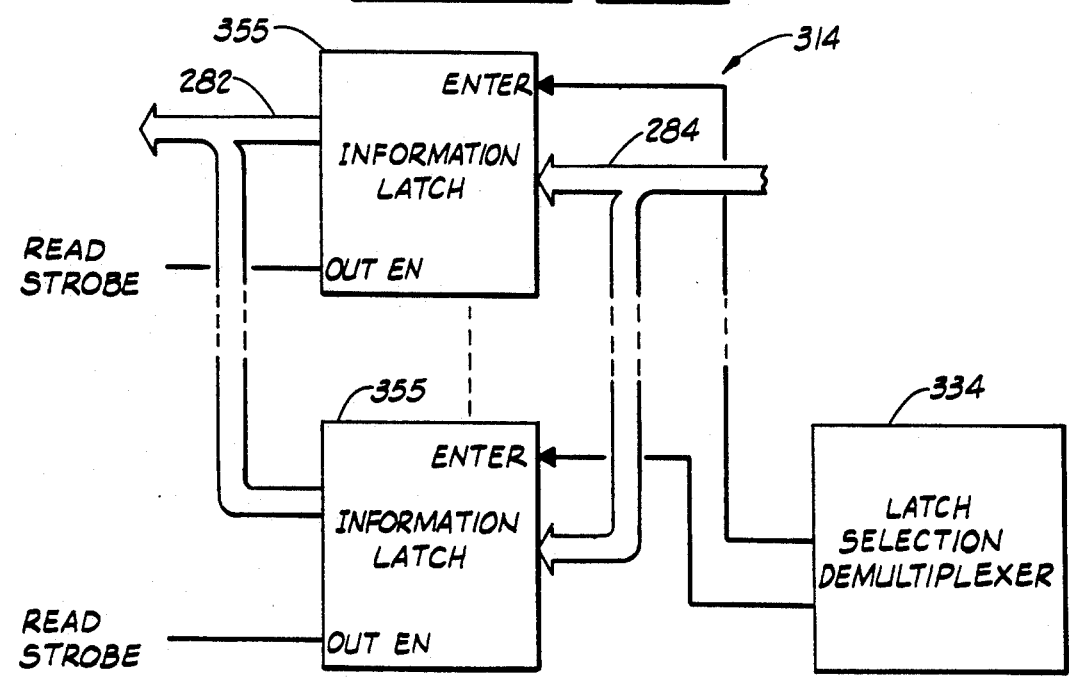
Figure 12:
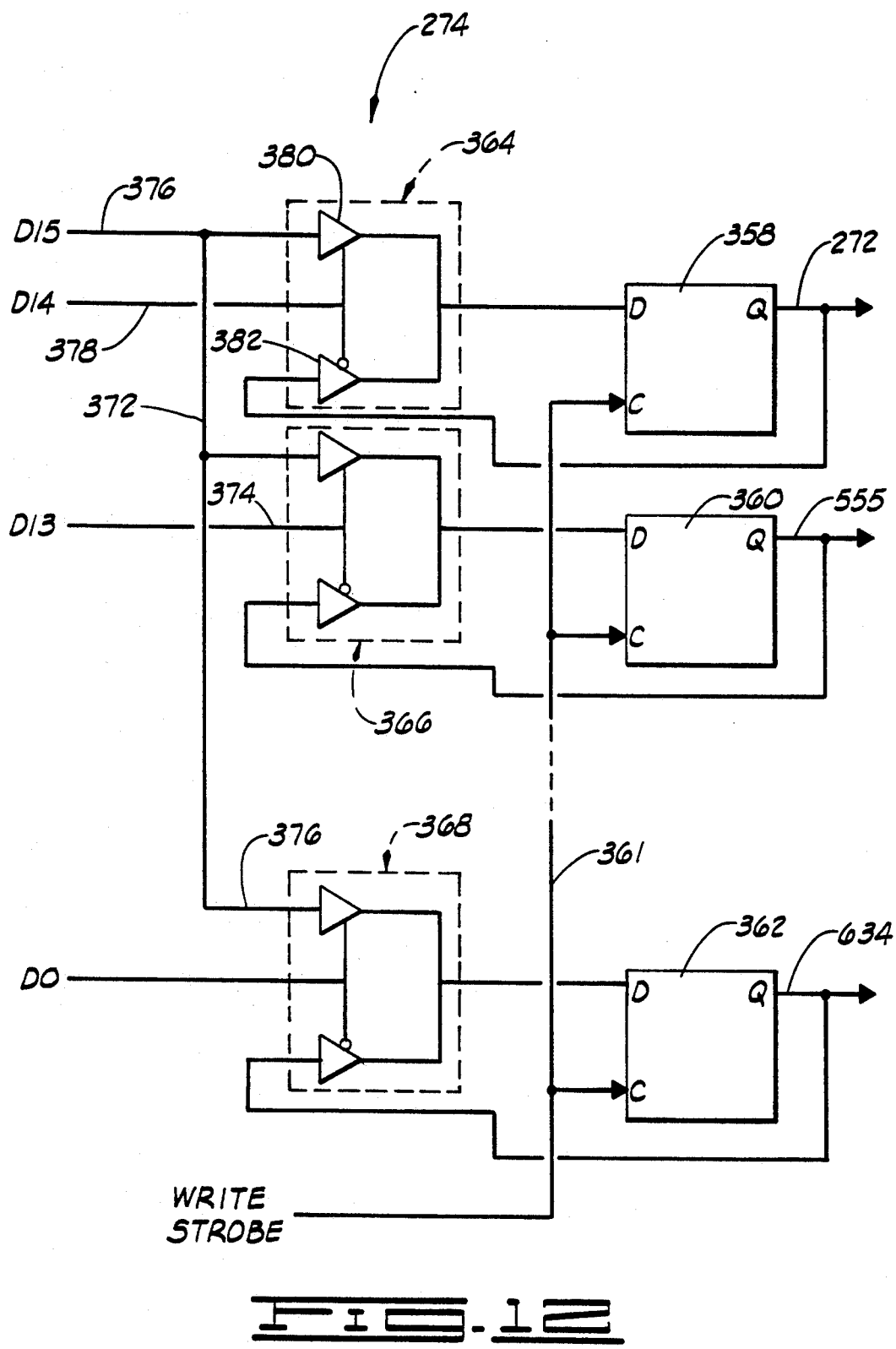
FIG. 12 is a fragmentary circuit diagram of the servo control latch shown in FIG. 6.

The use of the servo information register 314, the structure of which is shown in FIG. 11, is the opposite the use of the command register 312. As shown in FIG. 12, the servo information register 314 is comprised of a plurality of information latches 355, two of which have been illustrated in the drawing, which receive information relating to servo operations to be supplied to the system microcomputer 262. The data inputs of the latches 355 are connected to the data bus 284 of the servo microcomputer 274 and the enter terminals of the latches 355 are connected to selected outputs of the latch selection demultiplexer 334 so that the information to be supplied to the system microcomputer 262 can be outputted via a series of output instructions to a servo information port. The outputs of the latches 355 are connected to the data bus 282 of the system microcomputer 262 for inputting the information in the latches of the command executed register 314 in a conventional manner. As in the case of the command register 312, the servo information register 314 can be used for purposes other than outputting information to the system microcomputer 262.

It will also be useful to consider the structure and operation of the servo control latch 274 before proceeding to remaining components of the disc drive control circuit 132. Referring to FIG. 12, the servo control latch 274 is comprised of a plurality of type D flip flops, three of which have been shown and indicated by the reference numerals 358, 360 and 362, whose clock inputs all receive, via conducting path 361, the write strobe generated by an instruction calling for the output of data to a servo control port. As will be discussed below, the Q outputs of these flip flops provide control signals for remaining portions of the disc drive control circuit 132 to implement selected control methods and, further, to interrupt operation of the read/write circuit 264 should a read/write head that is writing data become displaced from the data track to which the data is being written sufficiently that writing to an adjacent track might occur. For this purpose, the conducting path 272 leading to the read/write circuit interrupt (FIG. 6) is connected to the Q output of one of the flip flops of the servo control latch; for example, the flip flop 358 as indicated in FIG. 12.

A will be appreciated by those of skill in the art, it is desirable to be able to output such an interrupt without disturbing other components of the disc drive control circuit 132 and, moreover, to be able to change each control variable independently of other control variables. More particularly, program steps can be avoided if only the control variables that is of interest needs to be considered. The servo control latch 274 is constructed to permit change of only one control variable at a time while reentering the remaining control variables. To this end, the number of flip flops in the servo control latch is selected to be one less than the number of conductors of which the data bus 284 of the servo microcomputer 278 is comprised and one conductor of the data bus 284 is allocated to the control bit that is to be entered into the servo control latch 274. The remaining conductors to identify the flip flop that is to receive the control bit.

The servo control latch 274 is further comprised of a plurality of single pole, double throw switches, one for each flip flop of the servo control latch 274, and three of these switches, for the flip flops 358, 360 and 362, have been shown in FIG. 12 and designated by the numerals 364, 366 and 368 therein. The new value of a control bit to be entered into the servo control latch 274 is transmitted to one input terminal of all of the switches 364, 366 and 368, via conducting paths partially illustrated at 370, 372, 374 and 376 in FIG. 12, and the other input terminal of the switch receives the value at the Q output of the flip flop with which the switch is associated. Control of the switch, to transmit a new control bit or the value contained in the flip flop associated with the switch, is via control of the switch by a signal on the data bus conductor that has been allocated to the switch and its associated flip flop. Thus, the switch 364 is controlled by a signal appearing on a data bus conductor indicated at 378. A suitable construction for a switch of the servo control latch 274 is a pair of tri-state gates, indicated at 380 and 382 for the switch 364, having output terminals connected together and to the D input terminal of the flip flop associated with the switch, having the input terminal of one gate connected to the data bus conductor that receives the control bit, and having the input terminal of the other gate connected to the Q output of the associated flip flop. One of the gates of each of the switches has an inverting enable terminal and the enable terminals of both gates are connected to the data bus conductor allocated to the switch and its associated flip flop. Thus, all that is necessary to output a new control bit to a component of the disc drive control circuit 132 is to place the bit value on data bus conductor allocated to the control bit, place a selection signal on the data bus conductor that has been allocated to the flip flop that is to receive the new control bit, and strobing all of the flip flops. Thus, for example, if the data bus 284 has sixteen conductors, the conductor of the data bus 284 that is to transmit the most significant bit is allocated to the control bit and the data bus conductor that transmits the bit of next significance is allocated to the flip flop that is used to enable writing of data to a disc, interruption of writing can be effected by outputting the number 1000000000000000 to the servo control port.

Returning to FIG. 6, the disc drive control circuit "132 comprises an offset latch 402 used to provide offset signals to circuitry, discussed below, used to determine the location of the servo head 116 on the dedicated servo surface. The latch 402 is a conventional latch that is connected to the servo microcomputer data bus 284 to receive digitally expressed signals at an offset output port to precondition servo input signals as will be discussed below.

As shown in FIG. 6, the disc drive control circuit 132 is further comprised of an actuator control circuit 404 by means of which servo correction signals, outputted from the servo microcomputer 278 at a correction signal output port, are translated into movements of the actuator 108 necessary to acquire and subsequently follow servo tracks on the dedicated servo surface. The circuit diagram of the actuator control circuit 404 is illustrated in FIG. 13 to which attention is now invited.

Figure 13:
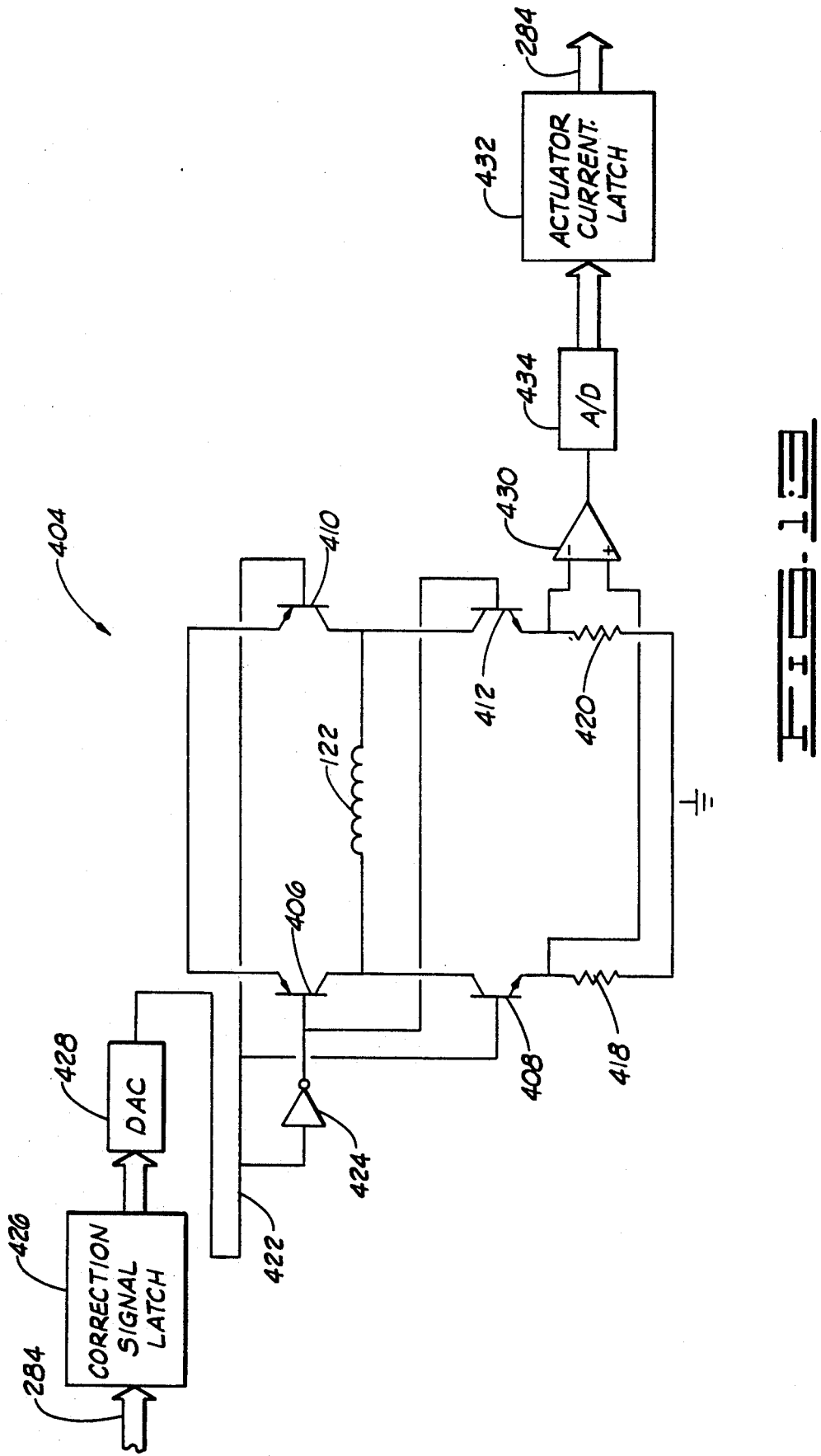
FIG. 13 is a schematic diagram of the actuator drive circuit.

As shown in FIG. 13, the actuator control circuit 404 is comprised of a push-pull power amplifier, not generally designated in the drawings, that is comprised of serially connected PNP and NPN transistors, 406 and 408 respectively, to the juncture of which one end of the actuator coil 122 is connected and serially connected, PNP and NPN transistors, 410 and 412 respectively, to the juncture of which the other end of the coil 122 is connected. The emitters of the PNP transistors 406 and 410 are connected together and to the high voltage end of the power source provided by a host computer as described above.

The emitters of the transistors 408 and 412 are connected to the hard disc drive ground, defined by the lowest voltage level received from the host computer, via resistors 418 and 420 respectively and the bases of the transistors 406, 408, 410 and 412 are interconnected in the conventional push-pull amplifier arrangement so that a current can be passed through the actuator coil 122, in either direction, via an analog control signal received on a conducting path 422 and transmitted directly to the bases of transistors 408 and 410 and via an inverting amplifier 424 to the bases of transistors 406 and 412. The control signal on conducting path 422 is provided via a conventional correction signal latch 426, that receives the correction signals outputted to the servo microcomputer data bus 284 at the correction signal output port, and a digital to analog converter 428.

The junctures of the resistors 418 and 420 with the transitors 408 and 412 are connected across the inputs of a conventional difference amplifier 430 to provide a measure of the magnitude and direction of the current through the actuator coil 122 and such measure is entered into an actuator current latch 432 via an analog to digital converter 434 at a selected time as will be discussed below.

Figure 14:
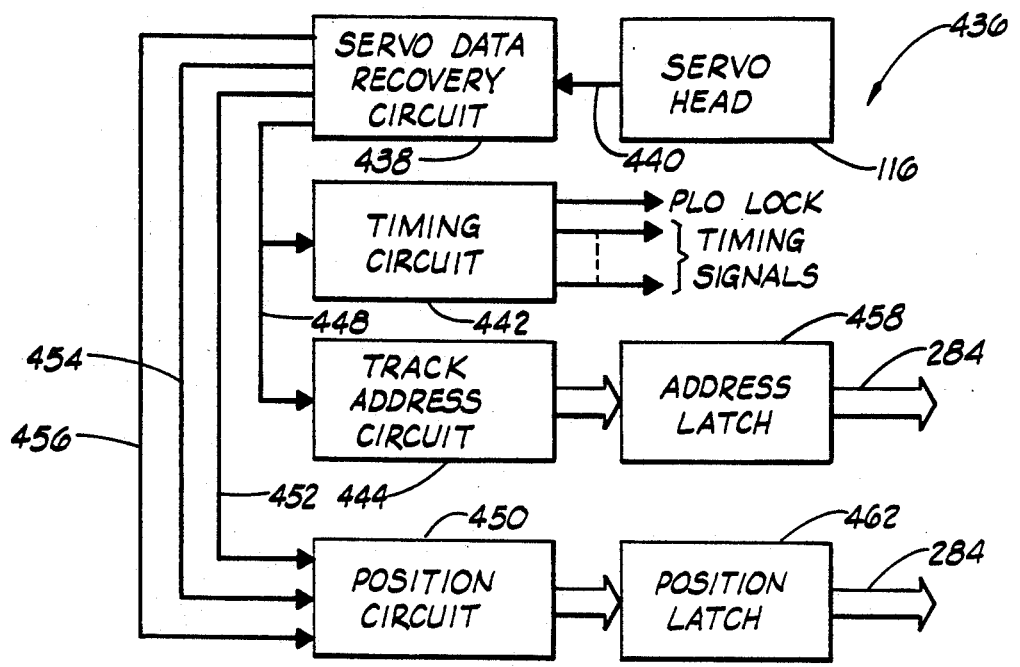
FIG. 14 is a block diagram of servo circuit of FIG. 6.

Returning to FIG. 6 and with additional reference to FIG. 14, the disc drive control circuit 132 is further comprised of a servo circuit 436 by means of which information necessary for the control of the position and movement of the actuator 108 is inputted into the servo microcomputer 278. Latches used for this purpose, and corresponding input port names, will be provided in the discussion of the components of the servo circuit 436 to follow.

As shown in FIG. 14, the servo circuit 436 is generally comprised of a servo data recovery circuit 438 that receives emf pulses induced in the servo head 116 by passage of servo elements by the servo head 116 on a conducting path 440 and responds by providing digital pulses indicative of the centers of the servo elements to a timing circuit 442 and a track address circuit 444 on a conducting path 448 and, further, by providing analog signals indicative of the amplitudes of the emf pulses arising from passage of the position field servo elements to a position circuit 450 on conducting paths 452, 454 and 456. The servo circuit is further comprised of address and position latches, 458 and 462 respectively, that provide servo information to the servo microcomputer 278 as will be discussed below.

Figure 15:
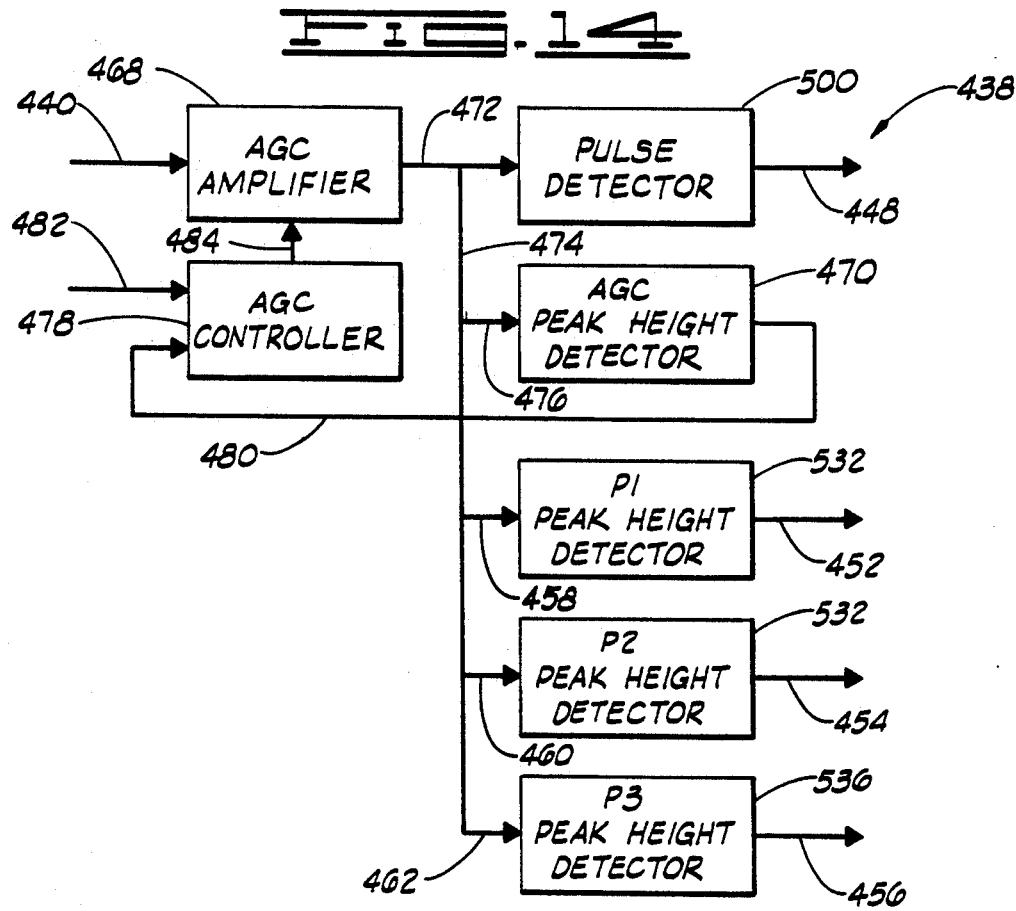
FIG. 15 is a block diagram of the servo data recovery circuit of FIG. 14.

A block diagram of the servo data recovery circuit 438 is presented in FIG. 15 to which attention is now invited. As shown therein, the servo data recovery circuit 438 is comprised of an AGC amplifier 468, which is a conventional variable gain amplifier, that passes emf pulses induced in the servo head 116 as the AGC field 156 passe the servo head with a varying gain that will provide a constant relationship between the amplitudes of the emf pulses and servo head location with respect to tracks on the dedicated servo surface for all locations of the servo head 116 on such surface. To this end, the output of the AGC amplifier is transmitted to an AGC peak height detector 470, on conducting paths indicated at 472, 474, and 476, and the AGC peak height detector 470 responds by providing a signal indicative of the emf induced by the passage of the AGC field servo elements to a conventional AGC controller 478 on a conducting path 480. The AGC controller 478 is a conventional difference amplifier, which also receives a signal at a selected reference level on a conducting path 482, and provides a control signal to the AGC amplifier 468 on a conducting path 484 to adjust the gain of the AGC amplifier 468 in a conventional manner. (The reference signal on conducting path 482 can be derived from a conventional voltage divider, not shown, that is connected across selected portions of the disc drive power supply.)

In order that the gain of the AGC amplifier be determined by the AGC servo elements, the AGC peak height detector 470 is gated into operation as the AGC servo elements pass the servo head 116 so that it will be useful before describing the AGC peak height detector 470 to briefly discuss the timing of the servo circuit 436. As is conventional, timing of events that occur during the operation of the disc drive 100 is controlled by the timing circuit 442, which has a conventional construction, relevant portions of which have been illustrated in FIG. 17. Before turning to this diagram, it will be useful to first consider the characteristics of emf pulses that are generated in the servo head 116 by passage of servo elements thereby and FIG. 16, which graphically illustrates an emf pulse in relation to a servo element, has been provided for this purpose.

Referring to FIG. 16, the upper graph, on time axis 486, indicates times that leading and trailing edges, 488 and 492 respectively, of a servo element, schematically indicated at 494 pass the servo head 116 and the middle graph, on time axis 496 illustrates the form of the response by the servo head 116 and AGC amplifier 468. In general, an emf pulse, that rises to a maximum with one sense of direction as the leading edge of the servo element passes the servo head, drops to zero as the center of the dibit passes the servo head and then rises to a maximum with the opposite direction sense, is induced in the servo head 116 with the amplitude of such pulse depending upon the overlap between the servo element and the flux gap of the servo head. The AGC amplifier 468 amplifies and slims the emf pulse and passes it, referenced to a selected voltage level indicated in FIG. 16 as Vref, to a pulse detector 500 shown in FIG. 15. The pulse reaching the pulse detector 500 thus has a time variation generally shown by the curve 498 in FIG. 16. The pulse detector 500, which is conventional, operates between the reference voltage and a pulse detection voltage, indicated as Vpulse in FIG. 16, to generate a digital pulse whose time variation has been indicated by the curve 502 on time axis 504. As indicated by the dashed lines 506 and 508, the pulse 502, which is referenced to the disc drive ground, rises when the output of the AGC amplifier reaches Vpulse and subsequently drops when such output returns to Vref. It will be noted that, if the amplitude of the pulse 498 never reaches the level Vpulse, no pulse 502 will be generated. Such point enters into the operation of the track address circuit 444 as will be discussed below. The output of the pulse detector 500 is transmitted on the conducting path 448 of FIG. 14 to the timing circuit 442.

Like the pulse detector 500, the timing circuit 442 is conventional and is presented only to provide a basis for describing novel aspects of the servo circuit 438. Thus, the timing circuit 442 need not be discussed in detail; rather, it will suffice to provide a general description that will enable the operation of other components of the servo circuit 438 to be understood.

With this point in mind, the timing circuit 442, shown in FIG. 17, is comprised of a sync decoder 510 that receives the pulses issuing from the pulse detector 500 on the conducting path 448 and clock pulses provided at a selected frequency on a conducting path 512. The sync decoder 510 is generally comprised of a plurality of registers (not shown) that provide a sync pulse on a conduction path 514 whenever the sync decoder receives a series of pulses, equal in number to the number of servo elements of the sync field 158, that have the same temporal spacing as emf pulses that will be induced in the servo head 116 as the sync field passes the servo head 116 during rotation of the discs 102 and 104 at the design speed for the disc drive 100. These sync pulses are transmitted to one input of a servo PLO 516 whose output is connected to the clock terminal of a timing counter 518. The count outputs of the timing counter 518 are, in turn, connected to a timing decoder circuit 520 that provides a rollover pulse to the other input of the servo PLO 516 so that the frequency and phase of the output of the servo PLO 516 will lock on the pulses being received from the sync decoder 510 in the conventional manner. That is, once PLO lock has been achieved, the frequency and phase of the PLO 516 will be continually adjusted in a direction that will tend to cause the sync and rollover pulses to temporally coincide.

The net result is that specific counts in the timing counter 518 will correspond to specific locations in the servo frame 152 once PLO lock has occurred. More particularly, the timing decoder circuit is a conventional gate circuit that provides selected counts of the timer, from 0 to a selected maximum count, at a plurality of outputs and the sync pulses are caused to correspond to the maximum count by providing the rollover pulses, via an OR gate 522 having inputs connected to decoder circuit outputs, that provide pulses whenever the count is 0 or the maximum count. The decoder circuit output corresponding to the maximum count is also transmitted to the reset terminal of the counter 518 to cause the counter to reset itself each time the maximum count is reached and, thereby, set the maximum count equivalent to the zero count. Thus, once PLO lock has been achieved, the sync pulses will occur at a zero count for the counter 518 and the servo frame will be divided into a number of divisions, each corresponding to a time interval having a duration of one period of the servo PLO output, that correspond to specific locations in the servo frame.

Before returning to FIG. 15 and a discussion of the manner in which AGC of the servo circuit 438 is effected, it will be useful to briefly note an additional point concerning the timing of events in the disc drive 100. As noted above, the spacing of the sync elements is unique and the result is that the sync pulse occurs at a point in a frame corresponding to a particular count of the counter 518. That is, there is only one reference point for locations of servo dibits in the servo frame 152. Thus, any count of the timing counter 520, or any group of counts, can be used to provide timing signals for any event in the operation of the disc drive 100 by including in the timing decoder circuit 520 a appropriate gate circuit to select the count or group of counts.

Returning to FIG. 15, the AGC peak height detector 470 is gated to receive the output of the AGC amplifier 468 as servo elements of the AGC field 156 pass the servo head 116. Since, as noted above, the servo elements of the AGC field are written to every track on the dedicated servo surface and, further, since the amplitude of the signal at the output of the AGC amplifier is a measure of the radial overlap of the servo head flux gap with servo elements of the servo pattern written to the dedicated servo surface, the AGC Peak height detector 470 will provide a signal to the AGC controller 478 that is indicative of the maximum emf that can be induced in the servo head 116. The choice of the maximum emf for AGC purposes is further implemented by the wide spacing of the AGC servo elements that has been noted above. More particularly, such spacing will minimize interference between the emf induced in the servo head 116 by the passage of one element of the AGC field with the emf induced in the servo head by passage of neighboring elements. The structure of the AGC peak height detector 470 will be discussed below.

As also shown in FIG. 15, the output of the AGC amplifier 468 is transmitted to each of three peak height detectors 532, 534 and 536 on the conducting path 472 and conducting paths 458, 460, and 462. The peak height detectors 532, 534, and 536, referred to as P1, P2 and P2 peak height detectors respectively, are gated to provide signals having amplitudes indicative of the overlap of the servo head flux gap with the P1, P2 and P3 elements, respectively, of the position field 152 to the position circuit 450 (FIG. 14), via the conducting paths 452, 454 and 456 respectively, to enable generation of a servo position error signal indicative of the location of the servo head 116 with respect to tracks of the dedicated servo surface as will be described below.

In the practice of the invention, the peak height detectors 532, 534, and 536 are operated in either of two modes, one for track seeking and one for track following, and the structure of the peak height detectors 532, 534 and 536 that enables such two-mode operation has been shown in FIG. 19 wherein the circuit diagram for the peak height detector 532 has been illustrated. The construction of the peak height detectors 534 and 536 is identical to the construction of the peak height detector 532 so that it will suffice to describe only the latter construction.

Referring to FIG. 18, the peak height detector 532 is comprised of a capacitor 544 having one plate connected, via a switch 546 and diode 548, to the conducting path 458 leading to the output of the AGC amplifier 468. More specifically, the cathode of the diode 548 is connected to the AGC amplifier 468 so that the potential at one end of the capacitor will tend to be drawn down to the peak of the signal of the curve 498 in FIG. 16 corresponding to the passage of the trailing edge of a servo element if the switch 546 is closed while the servo element passes the servo head 116. The other plate of the capacitor 544 is connected, via a resistor 550 which, with the capacitor 544, establishes the time constant for the peak height detector 532, to the system power supply to receive a voltage level substantially twice Vref. This time constant can be changed by closing a switch 552 in parallel with the resistor 550 via a signal that is outputted to the servo control latch 274 and received by the switch 552 on a conducting path 55 whenever track seeking between tracks occurs. During track following, the signal outputted to the servo control latch 274 will cause the switch 552 to open so that the time constant of the peak height detector 32 is made short during track seeking and long during track following for a purpose that will become clear below. For purposes of example, it will be assumed that such signal is provided on a conducting path 555 from the flip flop 360 the servo control latch shown in FIG. 12.

The signal from the servo control latch 274 is also transmitted to the control terminal of a switch 556 and the inverting control terminal of a switch 558 so that, during track seeking, the switch 556 is closed while, during track following, the switch 558 is closed. The switches 558 and 556 have outputs connected to the control terminal of the switch 546 and inputs connected to conducting paths 560 and 562 that receive signals from selected gate circuits (not shown) of the timing decoder circuit 520 of the timing circuit 442. The gate circuit connected to the switch 556 selects counts of the timing counter 518 corresponding to a time interval that begins substantially with the passage of the center of the P1 elements of the first subfield 226 of the position field 162 the servo head 116 and ends shortly after the trailing edge of the P1 elements by the servo head. The gate circuit connected to the switch 558 selects counts of the timing counter 518 corresponding to a plurality of such time intervals, one for the P1 element of each subfield of the position field. The P2 and P3 peak height detectors 534 and 536 have the same construction as the P1 peak height detector and are operated in the same manner.

Thus, the position circuit 450 which receives the potential at the lower end of the capacitors of the P1, P2 and P3 peak height detectors, as indicated by the designation of the signal path 456 therefrom in FIG. 19, will receive signals derived from only one of the position subfields during track seeking and the accuracy of such signals is optimized by providing the peak height detectors 532, 534 and 536 with short time constants which will enable the potentials at the lower ends of the capacitors of the detectors 532, 534 and 536 to follow the output voltage of the AGC amplifier 468. Thus, the signals received by the position circuit 450 will provide an unambiguous indication of the location of the servo head. During track following, the use of all position subfields to determine the signals received by the position circuit 450, coupled with a long time constant for the P1, P2 and P3 peak height detectors 532, 534 and 536 during track following, enables a more accurate determination of the servo head location by providing averages of signals derived from a plurality of position field servo elements to the position circuit 450.

As also shown in FIG. 18, the P1 peak height detector 532, as well as the detectors 534 and 536, are provided with discharge switches 564, paralleling the serially connected resistor 550 and capacitor 544, that are closed by timing signals from the timing decoder circuit 520 during passage of the address field 166 to discharge the capacitors of the peak height detectors. Thus, for example, the capacitor 544 is discharged by a signal received by the switch 564 on conducting path 566. The AGC peak height detector 470 preferably has a structure similar to that of the P1, P2 and P3 peak height detectors 532, 534 and 536 differing only in that no provision need be made for short time constant or single servo element operation of the AGC peak height detector 470.

Referring now to FIG. 19 wherein is shown a block diagram of the position circuit 450, the signals issuing from the outputs of the P1, P2 and P3 peak height detectors 532, 534, and 536 respectively, referred to herein as first, second and third position signals, are received by a switch circuit 566 which passes a selected pair of these signals to a difference amplifier 568 on conducting paths 570 and 572. In accordance with the present invention, the difference amplifier 568 is of the type having an output that is referred to a reference level that can be adjusted by an analog signal received at an offset terminal which, in the present invention, is connected, via a DAC 574 and a bus 576, to the offset latch 402. Thus, the reference level of the output of the difference amplifier 568 can be selected by entering an offset value in the offset latch 402 by placing such value on the servo microcomputer data bus 284 and delivering a write strobe to the enter terminal of the latch 402 on a conducting path 580. The purpose of such selection will be described below.

The output of the difference amplifier 568 is transmitted, via an A/D converter 578 and bus 582 to the input terminals of the position latch 462 for entry of a digitally expressed servo position error signal, indicative of the location of a selected read/write head with respect to a selected data track, into the position latch 462 in response to a signal received from the timing decoder circuit 520 on conducting path 584 immediately following passage of the position field 162 by the servo head 116.

Figure 20:
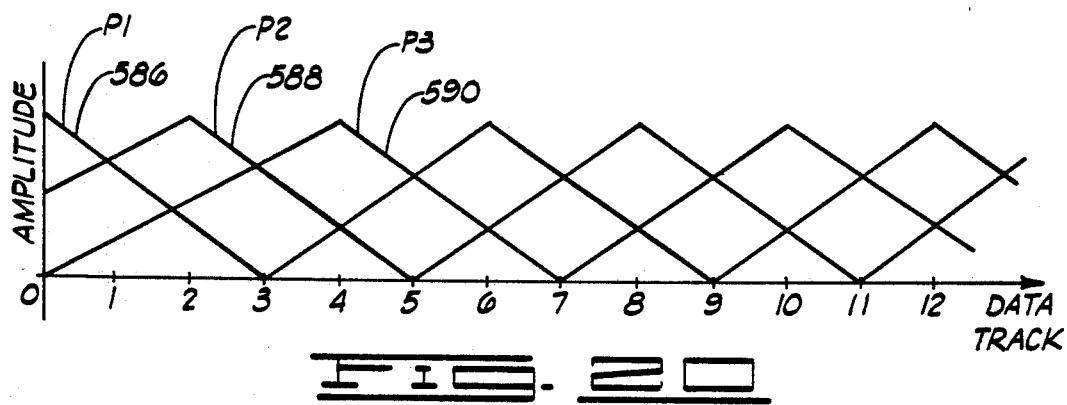
FIG. 20 is a graph illustrating the variation of position signal amplitude in relation to servo head location for each of the servo elements of the position field.
Figure 21:
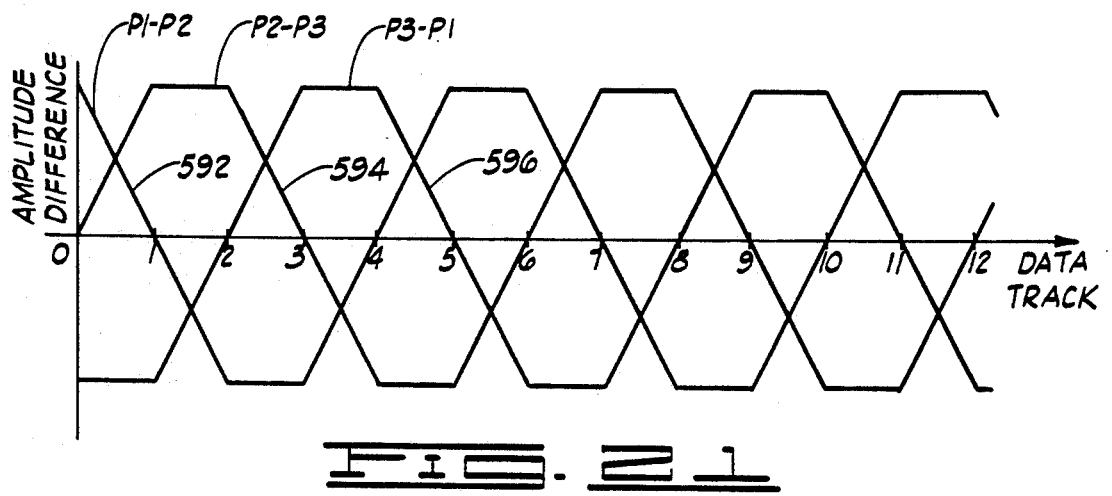
FIG. 21 is a graph illustrating differences in the amplitudes of the position signals in relation to servo head location.
Figure 22:
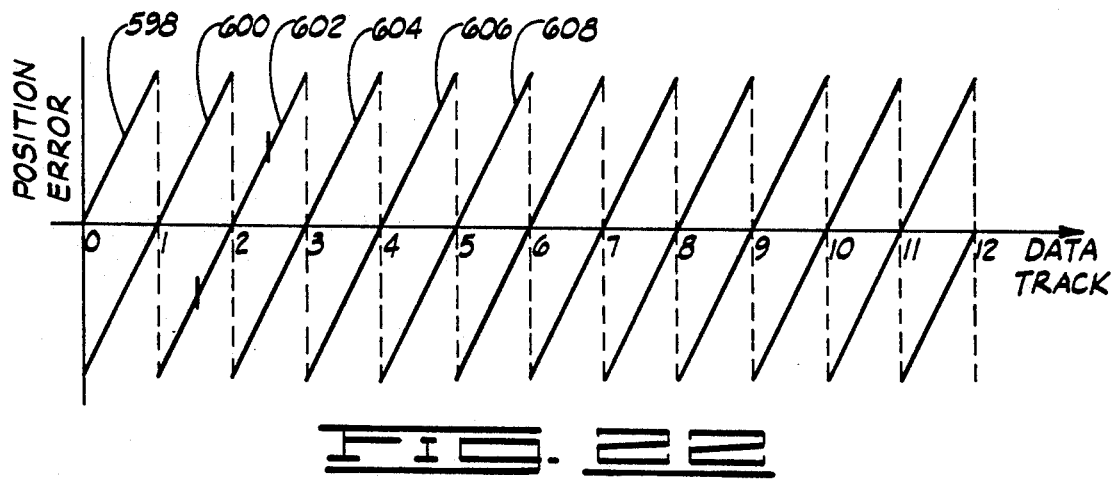
FIG. 22 is a graph illustrating servo position error in relation to servo head location.

Prior to discussing the selection of the position signal pair to be transmitted to the difference amplifier 568, it will be useful to first consider the basis for selection of the position pair and FIGS. 20 through 22 have been included for this purpose. In the discussion to follow it will be also be useful to represent the amplitudes the first, second and third position signals, generated in response to passage of first, second and third position servo elements by the servo head 116 by the symbols P1, P2 and P3. With such notation, idealizations of the amplitudes, P1, P2 and P3, have been presented in relation to the location of the center of the servo head flux gap within the position field 162, at 586, 588 and 590 respectively, in FIG. 20 where the amplitudes of the signals have been plotted on the ordinate and data track addresses have been plotted on the abscissa. Such plots are based on the model that the amplitude of the emf induced in the servo head 116 is directly proportional to the degree of overlap of the servo head flux gap and the servo element and such model will generally provide accurate peak height values for large amounts of overlap so that central portions of the curves 586, 588 and 590 are representative of the peak height variation of the signals P1, P2 and P3. As can be seen in FIG. 20, such variation is generally linear with location of the servo head 116 with respect to the data tracks on the dedicated servo surface.

The differences P1−P2, P2−P3 and P3−P1 have been plotted with respect to servo head flux gap location, at 592, 594 and 596 respectively, in FIG. 21 and, as can be seen therein, such plots exhibit rising portions extending one track to either side of even data tracks: for example, P3−P1 is generally increasing and substantially linear from track 1 to track 3 and is zero at track 2. About odd tracks, these differences decrease substantially linearly as, for example, shown by the portion of P1−P2 between tracks 0 and 2.

FIG. 22 is a plot of a servo position error signal derived from the increasing and decreasing portions of the curves 592, 594 and 596 by redrawing increasing portions of the curves 592, 594 and 596 and drawing decreasing portions of these curves with an inversion. Thus, the portions 598, 600, 602, 604, 606, and 608 are curves for P2−P3, −(P1−P2), P3−P1, −(P2−P3), P1−P2, and −(P3−P1) in the ranges centered on the tracks 0 through 5 respectively. Remaining portions of the curve in FIG. 22 merely repeat the portions 598 through 606.

It will be noticed that these portions of the differences in the peaks heights, or their negatives, thus define two linearly rising curves between each pair of data tracks on the dedicated servo surface. In the present invention, the two possible choices for a position error signal in each interval between successive data tracks is utilized to obtain an extended fine control region for generating position error signals during track following as will be described below.

Control of the switch circuit 566 to select the signals P1, P2 and P3 to be transmitted to the difference amplifier 568 is provided by a switch selector 610, the construction of which is shown in FIG. 23. As indicated in FIGS. 19 and 23, the amplitudes of the position signals P1, P2 and P3 on the conducting paths 425, 454 and 456 are transmitted to the inputs of three difference amplifiers 612, 614 and 616, the difference amplifier 612 receiving the position signals P1 and P2 to generate the difference P1−P2, the difference amplifier 614 receiving the position signals P2 and P3 to generate the difference P2−P3 and the difference amplifier 666 receiving the position signals P3 and P1 to generate the difference P3—P1. The outputs of the difference amplifiers 612, 614 and 616, in turn, are transmitted by pairs to the inputs of three comparators 618, 620 and 622. Specifically, the comparator 618 receives P1—P2 and P2—P3 at its non-inverting and inverting inputs respectively; the comparator 620 receives the differences P2—P3 and P3—P1 at its non-inverting and inverting inputs respectively; and the comparator 622 receives the differences P3—P1 and P1—P2 at its non-inverting and inverting inputs respectively. The outputs of the comparators have been graphically presented in FIG. 24 by the curves 624, 626 and 628, for the comparators 618, 620, and 622 respectively, in relation to location of the servo head 116 on the dedicated servo surface 105. As can be seen from these curves, the outputs of the comparators define a three bit number that changes at locations for the center of the flux gap of the servo head 116 halfway between successive data tracks on the dedicated servo surface.

Returning to FIG. 23, the switch selector is further comprised of three transparent latches 632, 634 and 636 that receive the signals at the outputs of the comparators 618, 620 and 622 and transmit such signals to A, B, and C inputs of a decoder 630 in the absence of a hold signal received on a conducting path 638 from the flip-flop 362 of the servo control latch 274 (FIG. 12). In the presence of a hold signal, the transparent latches present the decoder 630 with the outputs of the comparators at the time the hold signal was received by the transparent latches. Thus, the decoder 630 can be caused to receive the current outputs of the comparators 618, 620 and 622 or to hold outputs received at a selected time by outputting a hold bit to the servo control latch. The decoder 630 generates switch selection signals, on switch outputs S1, S2, S3, S4, S5 and S6, in accordance with the truth table presented in Table 1 wherein the corresponding ranges of location for the center of the servo head flux gap have also been listed for the case in which no hold signal is received by the transparent latches 632, 634 and 636.

TABLE 1

| RANGE (Data Tracks) | INPUTS | | | OUTPUTS | | | | | | | | |
|---|---|---|---|---|---|---|---|---|---|---|---|---|
| | A | B | C | S1 | S2 | S3 | S4 | S5 | S6 | E/O | O1 | O2 |
| −½ to +½ | 1 | 1 | 0 | 0 | 0 | 1 | 0 | 0 | 1 | 0 | 0 | 0 |
| +½ to 1½ | 0 | 1 | 0 | 0 | 1 | 1 | 0 | 0 | 0 | 1 | 0 | 1 |
| 1½ to 2½ | 0 | 1 | 1 | 0 | 1 | 0 | 0 | 1 | 0 | 0 | 1 | 0 |
| 2½ to 3½ | 0 | 0 | 1 | 0 | 0 | 0 | 1 | 1 | 0 | 1 | 0 | 0 |
| 3½ to 4½ | 1 | 0 | 1 | 1 | 0 | 0 | 1 | 0 | 0 | 0 | 0 | 1 |
| 4½ to 5½ | 1 | 0 | 0 | 1 | 0 | 0 | 0 | 0 | 1 | 1 | 1 | 0 |

The signals at the decoder output terminals S1 through S6 are transmitted on signal paths 638, 640, 642, 644, 646 and 648 to the switch circuit 566, the structure of which has been shown in FIG. 25. More particularly, the switch selection signals, which may be conveniently designated as signals S1 through S6, consistently with the designations of the switch select outputs of the decoder 630, are transmitted to control terminals of pairs of switches whose inputs receive the signals P1, P2 and P3 and whose outputs are connected to the inputs of the difference amplifier via the conducting paths shown in FIGS. 19 and 25. Specifically, the switch selection signals S1 and S3 are transmitted to switches 650 and 652 that both receive P1; the switch selection signals S3 and S4 are transmitted switches 654 and 656 that both receive P2; and the selection signals S5 and S6 are both transmitted to switches 658 and 660 that both receive P3.

The outputs of the switches 650, 654 and 658 are connected, via the conducting path 570 to the non-inverting input of the difference amplifier 568 and the outputs of the switches 652, 656 and 660 are connected via conducting path 572 to the inverting input of the amplifier 568. With such connections and with the truth table shown in table 1, the signals, P1, P2 and P3 transmitted to the difference amplifier 568 will define limited fine control regions for the location of the center of the servo head flux gap that are centered on the data tracks of the dedicated servo surface and extend one half data track spacing to either side thereof. Thus, for example, in the range from one half track to either side of track 2, the selection signals S2 and S5 will be high to transmit P3 to the non-inverting input of the difference amplifier 568 and to transmit the signal P1 to the inverting input of the difference amplifier 568. Consequently, in the absence of a hold signal that will cause the transparent latches 632, 634 and 634 to hold a previously received pattern of signals from the comparators 618, 620 and 622, the position error signal entered into the position latch by a decoder pulse received on conducting path 584 will vary in relation to the location of the center of the servo head flux gap as shown for the portion 602 of the position error curve from the midpoint of tracks 1 and 2 to the midpoint of tracks 2 and 3. Similar limited fine control regions will be defined, again in the absence of a hold signal received by the transparent latches 632, 634 and 636, about each of the other data tracks on the dedicated servo surface.

However, as will be clear from the characteristics of the transparent latches 632, 634 and 636, reception of the hold signal will fix the comparator outputs received by the decoder 630 to extend the fine control region in which the center of the servo head flux gap is currently located to an extended fine control region that contains the same track as the limited fine control region but extends a full track spacing to either side of such track. In the practice of the invention, the hold signals are provided to the transparent latches during track following but not during track seeking. Thus, the limited fine control regions can be used to determine the position of the servo head 116 from the nearest track during track seeking, as will be described below, and the extended fine control regions can be used during track following to locate the servo head with respect to the track being followed without regard to whether the servo head 116 may have become displaced, intentionally or unintentionally, from such track. One benefit of using the extended fine control regions for track following is that it makes the disc drive 100 less susceptible to track loss occasioned by mechanical shock received by the disc drive and another benefit is that the servo head can be displaced a greater distance from the servo track to cause a read/write head to follow a data track at such times that the servo and read/write heads or tracks on data and servo surfaces are not aligned. Both of these benefits enable the data track spacing to be minimized to provide a greater data storage capacity for hard disc drives.

Returning to FIGS. 19 and 23, the decoder 630 has additional outputs, E/O, φ1 and φ2, that respond to the pattern of signals at the decoder input terminals as indicated in the last three columns of Table 1. By comparison of these columns to the servo head position ranges to which the patterns of inputs correspond in the absence of a hold signal to the transparent latches 632, 634 and 636, it can be seen that the E/O output is 0 for each even data track and 1 for each odd data track on the dedicated servo surface. The use of the signal on the E/O output, via a conducting path 662 in FIGS. 20 and 24, will be discussed below.

Comparing the pattern of signals at the 01 and 02 outputs with the servo head position ranges Table 1, it is seen that, for data tracks having addresses expressible as 3k, where k is an integer, $\phi1$ and $\phi2$ provide the binary expression of the number 0. Similarly, for tracks expressible as 3k+1 and tracks expressible as 3k+2, and provide the binary expression of the numbers 1 and 2. The signals appearing at the $\phi1$ and $\phi2$ outputs of the decoder 630, referred to herein as a track phase code of the data track for which the signals are generated, are transmitted to phase latch 664 shown in FIG. 19 via conducting paths 666 and 668 and entered into such latch by a timing signal received from the timing decoder circuit 520 on conducting path 670 immediately after the position field 162 has passed the servo head 116. The purpose of the phase signals will be discussed below.

Referring now to FIG. 26, the track address circuit 444 is comprised of a type D flip flop 672 having a clock input connected via an inverter 674 to the output of the pulse detector 500 of the servo data recovery circuit 438. The D input of the flip flop 672 is connected to the disc drive power supply to receive a regulated voltage above the drive ground so that a voltage level expressing a logic level "1" can be clocked into the Q output of the flip flop 672 via pulses that are generated by the pulse detector 500 in response to emf pulses induced in the servo head 116 by passage of servo elements on the dedicated servo surface by the servo head 116. The track address circuit 444 is further comprised of shift register 676 having a D input connected to the Q output of the flip flop 672 via a conducting path 678 so that the logic level at the Q output of the flip flop 672 can be clocked into the shift register 676 by a signal received on a conducting path 680 from the timing circuit 442. Additional timing signals are received from the timing circuit 442 at a reset terminal of the flip flop 672 via a conducting path 682.

The outputs of the shift register 676 are connected to the inputs of a decoder 684 in a manner that the first of a series of logic levels clocked into the shift register 676 provides the most significant bit of a number that is transmitted to the decoder 684. As will be discussed below, the track address circuit 444 is operated during passage of the address field 160 of each servo frame 152 such that the servo track address of the data track nearest the centerline of the servo head flux gap is clocked into the shift register 676. Thus, since the servo track address is expressed in a Grey code, as noted above, the servo track address of the data track most nearly in radial alignment with the servo head 116 will reside, in Grey code, in the shift register 676 following passage of the address field by the servo head 116. The decoder 684 is a conventional Grey-to-Binary decoder that converts the contents of the shift register 676 to a pure binary expression of the servo track address in the shift register 684 and transmits the decoded address to the address latch for entry at the same time that the position error signal is entered into the position latch 462. To this end, the enter terminal of the address latch 458 receives the same enter signal from the timing circuit 442 that is received by the position latch 462 on the conducting path 584 shown in FIG. 19 and carried into FIG. 26. Additionally, the least significant bit position of the address latch 458 receives the E/O output of the decoder 630 of the position circuit 450 on the conducting path 662 shown in FIGS. 19 and 23 and carried into FIG. 26. Since the E/O output of the decoder 630 is low for even servo tracks and high for odd servo tracks, the contents of the address latch following entry of the contents of the decoder 684 and the E/O bit will be the address of the data track on the dedicated servo surface that is most nearly in radial alignment with the servo head 116.

To discuss the entry of the servo track address into the shift register 684, it will be useful to first briefly review the operation of the pulse detector 500 with respect to the manner, shown in FIG. 16, in which pulses are generated in response to passage of servo elements on the dedicated servo surface. As shown in FIG. 16, the pulse detector 500 is constructed to provide a rising pulse edge each time the output of the AGC amplifier reaches a selected voltage indicated as Vpulse and a falling pulse edge as the AGC amplifier output voltage returns to the AGC reference level Vref. In the practice of the invention, the AGC control signal received from the AGC controller 478 is selected such that Vpulse will be at one half the amplitude of the pulses 498, with respect to Vref, during passage of the AGC field by the servo head. Since the AGC field servo elements extend continuously from the innermost data track to the outermost data track, Vpulse will, accordingly, exceed Vref by half the amplitude of the pulse 498 that occurs for complete radial overlap between the servo head flux gap and a dedicated servo surface servo element. Thus, if more than half of the servo head flux gap radially overlaps a servo element on the dedicated servo surface, a pulse will be generated by the pulse detector 500; on the other hand, if less than half the flux gap of the servo head 116 radially overlaps the servo element, no pulse will be generated by the pulse generator 500.

With this point in mind, reference is made to FIG. 4 wherein a portion of the address field 160 has been illustrated. As can be seen in such figure and as described above, the address field servo elements begin and end one half data track space before a change in the servo track address. Thus, the radial overlap between the servo head flux gap and an address field servo element changes from more than one-half to less than one-half, and vice versa, at servo head locations for which the centerline of the flux gap is halfway between two data tracks for which the servo track numbers differ by one. Thus for example, the transition for one edge of the servo element 684 in FIG. 4, the second least significant bit of the servo track address, occurs at the midpoint between servo tracks 1 odd and 2 even as shown by the dashed representation of the servo head flux gap at 686 and the transition for the other edge occurs at the midpoint between servo tracks 5 odd and 6 even as indicated by the dashed flux gap representation at 688. Thus, less than half the flux gap will overlap the second least significant servo element of the address field for the first two servo, tracks more than half of the flux gap will overlap such servo element for the next four servo tracks, less than one half four the next four servo tracks and so on. This pattern is, of course, the pattern for the second least significant bit of the Grey code in which the track addresses are written. Since, as discussed above, the pulse detector 500 generates a pulse when more than half of the flux gap overlaps a servo surface servo element, pulse generation follows the servo track address, expressed in Grey code, of the data track nearest the centerline of the servo head flux gap.

Returning to FIG. 26, servo elements of the address field are read during passage of the address field 160 by the servo head 116 and used to clock the Grey code address of the servo track nearest the centerline of the servo head 116 into the shift register 676 as will now be described with additional reference to FIG. 27. Shown in FIG. 27 is a timing diagram that illustrates; (1), on the time line 690, the times that leading and trailing edges of a sampling of the servo elements of the track address field 160 pass the servo head 116; (2), pulses that are consequently received at the clock input of the flip flop 672 from the pulse detector 500 and the invertor 674, for a sample radial location of the servo head 116 on the dedicated servo surface; and (3), timing signals received from the timing circuit 442 at the reset terminal of the flip flop 672, on time line 694, and at the clock terminal of the shift register 676, on time line 696. For purposes of discussion, three servo elements of the track address field 160 have been represented by blocks 698, 700 and 702, and it is assumed for the example that the flux gap of the servo head 116 completely overlaps the servo element represented by the block 698, has no overlap with the servo element represented by the block 700, and partially overlaps the servo element represented by block 702. More specifically, the graphs of FIG. 27 contemplate that the servo head flux gap overlaps the servo element represented by the block 702 by an amount that is greater than one half the width of the flux gap.

As the servo element represented by the block 698 approaches the servo head 116, the output of the AGC amplifier 468 will rise to the level Vpulse, at a time that is before the leading edge of the servo element, indicated at 704 for the servo element representation 698 in FIG. 27, reaches the servo head 116 so that the output of the pulse detector 500 will undergo a rapid transition from a low voltage level to a high voltage level and the output of the invertor 674 will undergo a corresponding rapid drop as indicated at 706 on time line 692 in FIG. 27. Subsequently, the center of the servo element represented by the block 698 will pass the servo head 116 so that, as can be seen in FIG. 16, the output of the pulse detector 500 will drop to provide a corresponding rise in the output of the invertor 674 as indicated by the edge 708 on time line 692. Since the output of the invertor 674 is connected to the clock input of the flip flop 672 and the D input of the flip flop 672 is connected to a regulated voltage above system ground, the edge 708 will clock a voltage corresponding to a logic level 1 into the Q output of the flip flop 672 corresponding to a logic level 1 for the bit of the Grey code address of the servo track nearest the centerline of the servo head flux gap.

This logic level 1 is then shifted into the shift register 676 by a shift timing signal 710 received from the timing circuit 442 following passage of the trailing edge of the servo element as indicated at 712 in the servo element representation 698. The flip flop 672 is then reset by a pulse 714 received from the timing circuit 442 on the conducting path 682.

As the next servo element, represented by block 700, approaches the servo head 116, the lack of radial overlap of such servo element with the servo 116 will result in no rise of the AGC amplifier output so that no pulse is generated by the pulse detector 500 and the output of the invertor 674 will remain high as indicated at 716 in FIG. 27. Hence, no clocking of the flip flop 672 will occur and the Q output of the flip flop will remain low. Thus, when a subsequent shift pulse 718 is transmitted to the shift register clock terminal from the timing circuit 442, a logical zero, corresponding to a zero in the Grey address of the servo track nearest the centerline of the servo head, will be entered into shift register 676.

Following such entry, another reset pulse 720 will be transmitted to the flip flop 672 from the timing circuit 442. In view of the zero level at the Q output of the flip flop 672 arising from the reset pulse 714, no change in the state of the flip flop 672 will occur. Thus, the pulse 718 has been illustrated to show the general clocking of the track address circuit 444 as the track address field passes the servo head. As shown in FIG. 27, reset pulses are transmitted to the flip flop 672 prior to the passage of each servo element of the track address field (The reset pulse for the servo element represented by the block 698 is shown at 722 and the reset pulse 714 is provided for the servo element represented by the block 700.) and a shift pulse follows the passage of each dibit. Thus, the logic level of each bit that is shifted into the shift register 676 depends upon the track address of the servo track nearest the servo head centerline. If a bit of such address is 0, a zero bit is shifted into the shift register 676; if the bit is 1, a 1 bit is shifted into the shift register 676. In this respect, it is noted that, as discussed above, the servo elements of the track address field are written so that changes in track addresses occur at the midpoints of each pair of data tracks having differing servo track numbers. Thus, if the nearest data track contains an address bit 1 and the next nearest data track contains a bit 0, the bit 1 will be entered into the shift register as is illustrated by the bit representation 702.

As noted above, the present example assumes that the track address of the nearest data track is such that the servo element represented by the block 702 overlaps more than one half the flux gap of the servo head 116. Thus, in view of the selection of Vpulse that has been described above, the output of the AGC amplifier 468 will rise to Vpulse very shortly prior to passage of the leading edge of the servo element by the servo head, as indicated by the dashed pulse 724 in FIG. 16 to give rise to a falling edge and subsequent rising edge, 726 and 728 respectively, from the invertor 674 to clock a 1 into the flip flop 672 Q output so that the 1 bit of the track address of the nearest data track will be subsequently shifted into the shift register 676. Conversely, if a bit of the nearest track address is zero, the output of the AGC amplifier 468 will rise to a level below Vpulse and the flip flop 672 will remain reset for the shifting of a track address bit 0 into the shift register 676. Thus, following passage of the address field 166 by the servo head, the shift register 676 will contain the address of the nearest servo track so that, following the passage of the position field 162, the address of the nearest data track can be entered into the address latch as described above.

Referring to FIG. 28, inputting of the contents of the actuator current latch 432 and the position latch 462 is effected on a combined input port by successive input combined port instructions issued following passage of the position field of the servo frame 152. To this end, the servo circuit 436 is comprised of a counter 744 having a clock terminal that receives the port select signal for the combined port on a conducting path 746 from the decoder 290 (FIG. 7) and a reset signal on the conducting path 306 (FIG. 7) by means of which the servo microcomputer receives interrupt signals as noted above. The count outputs of the counter 744 are connected to the output selection inputs of a demultiplexer 748 to select one of a plurality of conducting paths 750 and 752 leading to the output enable terminals of the latches 432 and 462 respectively so that a read strobe received by the demultiplexer 748 on a conducting path 756 in response to a program instruction for inputting the combined port will be place the contents of the latch identified by the counter 744 on the servo microcomputer data bus 284. The conducting paths 750 and 752 correspond to counts 0 and 1 respectively so that, since the port select signals are expressed in negative logic, as described above, the counter 744 will be clocked at the end of each input combined port instruction so that two such instructions in succession will input the contents of the each of the latches 432 and 462 following an interrupt of the servo microcomputer 278. While only two latches have been shown for the combined port, it will be clear that additional latches could be provided.

SERVO OPERATIONS OF THE DISC DRIVE

The present invention contemplates that the control of servo operations in the hard disc drive 100 will be carried out using the multi-task operating system that is taught in U.S. patent application entitled "Multi-Task Operating System for a Disc Drive" filed Jul. 31, 1991 by Hampshire, the teachings of which are incorporated herein by reference. Moreover, it is contemplated that adaptive methods will be used in the disc drive 100. Thus, for example, it is contemplated that the method taught in U.S. patent application entitled "Method for Compensating for Variations in Torque Constant of Voice Coil Motors in Disc Drive Actuators" filed Jul. 31, 1991 by Funches et al., the teachings of which are incorporated by reference, may be used in the present invention. Similarly, the offset nulling system taught in U.S. Pat. No. 4,969,059, issued Nov. 6, 1990 to Volz et al., the teachings of which are incorporated herein by reference, to compensate for forces exerted on the actuator 108 can be readily implemented in the disc drive 100. Similarly, it contemplated that noise reduction during seeking may be minimized in accordance with the methods taught in U.S. patent application entitled "Acoustic Noise Reduction in a Disc Drive Using a Time Varying Exponential Demand Filter with an Anticipator" filed Jul. 31, 1991 by McKenzie and incorporated herein by reference, may be used in the disc drive 100. Finally, conventional methods for compensating for misregistration of data heads with the servo head and misregistration of the discs can similarly be utilized in the disc drive 100. Prior to discussing the operation of the disc drive 100, it will be useful to briefly discuss the adaptive methods and the multi-task operating scheme.

In the present invention, the adaptive methods can be implemented either through programming of the system and servo microcomputers or by use of the offset latch 402 of the position circuit 450. In this case, a compensation value is entered into the offset latch during track seeking and track following operations so that the servo position error signal received by the servo microprocessor 278 will be representative of the location of the servo head 116 with respect to the servo track on the cylinder that includes a data track to which a seek is to be made or which is to be followed. Thus, for example, offsets as determined in the aforementioned U.S. Pat. No. 4,969,059 can be introduced into the offset latch 402 at a time to be discussed below. Similarly, as will become clear below, the offsets can be varied with orientation of the discs and such variation is useful for obtaining servo position error signals that indicate the distance of the read/write head from a track being followed instead of the distance between the servo head and the corresponding servo track. The use of programming to effect adaptive techniques will be discussed below.

In the multi-task operating system, servo operations are carried out during interrupts of the execution of a main program and, in the present invention, such interrupt is caused to occur, by a negative pulse delivered to the interrupt terminal of the servo microcomputer 278 from the timing decoder circuit 520 immediately following the passage of the position field 162 by the servo head 116. Thus, it is the operation of the disc drive 100 during interrupts, and the interaction of the servo microcomputer with the system microcomputer 262, that is relevant for purposes of the present disclosure.

Referring first to FIG. 29, shown therein is a flow chart for a command block that is executed by the system microcomputer 262 to initiate servo operations that are to be carried out by the servo microcomputer 278 and the servo circuitry that has been described above. In the present invention, the program for the system microcomputer 278 includes many such control blocks, each commanding the servo microcomputer 278 to carry out a specific servo operation; for example, to seek to a selected destination track 2 on the discs 102, 104. In the absence of such a command, the servo microcomputer 278 operates autonomously to follow the data track currently aligned with the servo head 116 as will be described below.

In the first step, 792, of a command block, the system microprocessor 262 outputs a command to be carried out to the command latch 350 shown in FIG. 10 and follows such step with a plurality of parameter outputs to the parameter latches 352, similarly shown in FIG. 11, at the step 794. As noted above, it is contemplated that information necessary to execute a command will not be permanently stored in the memory of the servo microcomputer 278. Thus, for example, in accordance with the present invention, coefficients of control equations by means of which correction signals are determined for output of correction signals to the actuator coil 122 are not stored in ROM of the servo microcomputer 278. Rather, they are stored in the parameter ROM 276 of the system microprocessor 262 and implemented in a package that is separate from remaining portions of the system microcomputer memory. Adaptive data, generated during start up of the disc drive 100 as described, for example, in the aforementioned U.S. patent application entitled "Method for Compensating for Variations in Torque Constant of Voice Coil Motors in Disc Drive Actuators" can similarly be stored in RAM of the system microcomputer 262.

The implementation of the parameter ROM in a separate package provides one of the novel aspects of the disc drive 100. In the disc drive 100, correction signals are outputted to the actuator coil 122 at each interrupt so that the actuator coil 122, of necessity, receives a series of step adjustments as time passes. Such step adjustments give rise to transient vibrations of the actuator 108 that can be suppressed by low pass filtering and such filtering can be conventionally implemented in the selection of control equation coefficients used to determine the correction signal from data inputted into the servo microcomputer 278 from the servo circuit 436. Experience in the field will often indicate desirable changes to these coefficients and the storage of the coefficients in the ROM 276 provides for rapid change of the coefficients in the field. All that need be done is remove the package that ROM 276 and replace it with a ROM containing the new coefficients.

Once the parameters, which can include adaptive values stored in RAM of the system microcomputer have been outputted to the parameter latches 352, the system microcomputer 262 outputs a command waiting instruction to the command waiting latch 316 of FIG. 8, step 796 in FIG. 29, and enters a loop indicated by the decision block 798 in which the command executed latch 318 is repeatedly inputted. Such loop continues until the servo microcomputer outputs "command executed" to the command executed latch 354. Once "command executed" is read by the system microcomputer 262, an optional step 800 is carried out and the block ends. The step 800, in which selected information latches 354 are inputted by the system microcomputer occur whenever the command that was issued requires the generation of adaptive data by the servo microcomputer 278.

To discuss the interrupt program by means of which servo operations are implemented, it will be useful to briefly review the multi-task operating system that has been described in the above referenced U.S. patent application entitled "Multi-Task Operating System for a Disc Drive". In such system, the servo microcomputer stores two sets of routines, modes and commands, that can be executed by placing the addresses of the initial instructions of a mode or a command in the program counter of the microcomputer. For this purpose, each mode and each command that can be executed is assigned a mode or command number that identifies an address in the servo microcomputer ROM at which the initial instruction of the mode or address is stored. If the above-identified TMS320C15 microprocessor is used in the servo microcomputer 278, a call accumulator instruction, at such times that the number assigned to a particular mode or command is in the servo microcomputer accumulator, will load such numbers into the program counter. To this end, one address in the servo microcomputer RAM, a mode address, is allocated to the storage of the mode numbers and another, a command address, to the command numbers so that the mode and command numbers can be loaded into the accumulator. (In the TMS320C15, such loading is effected by loading a base mode or command number into the accumulator and then adding the mode or command number to the number in the accumulator.) Thus any of the modes or command can be caused to be executed by a call accumulator instruction.

Figures 30, 31:
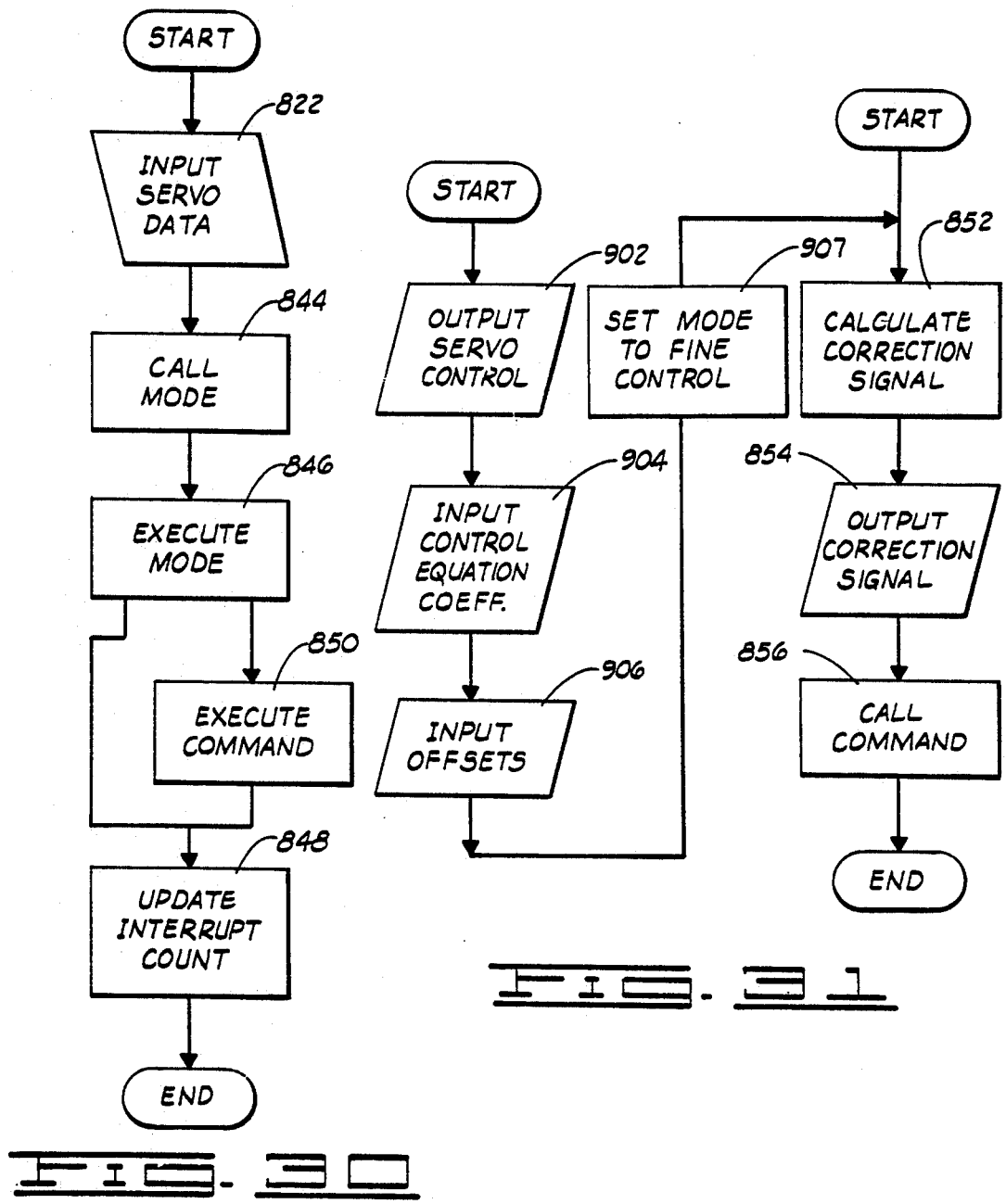
FIG. 30 is a flow chart for the interrupt program of the servo microcomputer.
FIG. 31 is a flow chart for the fine control initialization and fine control mode routines.

With this introduction, a flow chart of the servo program microcomputer interrupt program has been presented in FIG. 30 to which attention is now invited. Each time an interrupt occurs, servo data in the latches of the servo circuit 436 is inputted to the servo microcomputer 278 as indicated by the input block 822 in FIG. 30. As will be clear from the above discussion such data includes the servo position error signal in the position latch 462, the actuator motor current in the actuator current latch 458, the track phase code in the phase latch 664 and the track address in the address latch 458.

A mode is then called, at step 844, and executed at step 846. Depending upon the mode routine that is called, an address in which interrupts are counted from index is updated, step 848, or a command routine is executed, step 850. (As noted above, it is contemplated that the disc drive will include an index circuit as described in the aforementioned U.S. patent application Ser. No. 560,438. An index pulse generated by such circuit by passage of the sector field by the servo head 116 is inputted into the servo microcomputer 278.) Following a command routine, the count of the number of interrupts from index is updated at step 848 and the interrupt ends. Such count is useful when the servo microcomputer is programmed to output offsets that vary with orientation of the discs to the offset latch 402.

With the above introduction, the manner in which track seeking and track following are carried out in the disc drive 100 can now be discussed. Referring first to FIG. 31, the mode called in each interrupt during track following is a fine control mode that begins with the calculation of a correction signal, step 852, using a control equation whose coefficients have been previously inputted from the system microcomputer 262 and the servo position error that will have been inputted from the position latch 462 at the beginning of the interrupt. The correction signal is outputted to the correction signal latch 426, step 854, and a command is then called, step 856. Thus, the interrupt routine shown in FIG. 30 will proceed to the step 850 for the execution of a command routine currently indicated in the command address of the servo microcomputer RAM. As will become clear below, during stable track following, such command will be the "receive new command" routine that has illustrated in FIG. 32.

Figure 32:
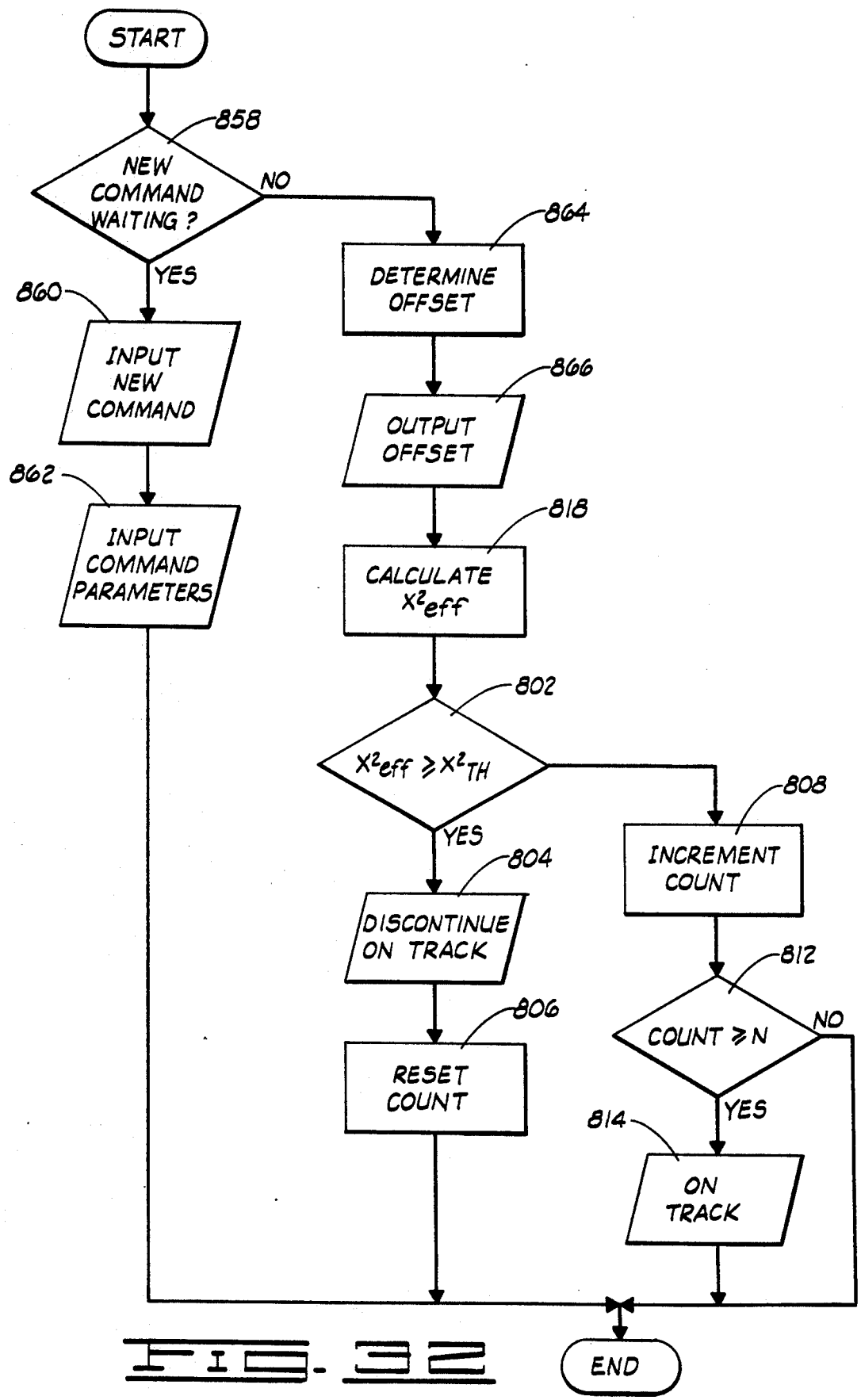
FIG. 32 is a flow chart for the receive new command command routine.

Referring to FIG. 32, the "receive new command" routine begins with a new command waiting decision block 858 that is implemented by reading the command waiting latch 316 of the communications circuit 280 to determine whether the system microcomputer 262 has issued a new command since the previous interrupt. If so, the new command is inputted from the command latch 350 along with any parameters that are needed to carry out the command from the parameter latches 352 at steps 860 and 862. If not, an offset is calculated, step 864, and outputted, step 866, to the offset latch 402 of the position circuit 450 shown in FIG. 19. In the present invention, the offset will be determined from adaptive parameters provided to the servo microcomputer at a time that will be noted below. The offset may be dependent upon the orientation of the disks and, in such case, the stored interrupt count provides a means of calculating the offset for each interrupt.

Following the output of the offset, the command routine determines whether the read/write head for which the offset has been made is radially misaligned with the data track currently being followed sufficiently that writing to an adjacent track might occur. To prevent this from occurring, it is common practice to establish on track thresholds that are of the order of 10% of the data track spacing and interrupt writing at any time that a data head that is to write to a disc is outside the on track threshold.

A problem that has arisen in the past is that writing to an adjacent track can occur before the interruption can take place; for example, if the hard disc drive is subjected to a mechanical shock that imparts a rapid movement to the actuator 108. In one aspect of the present invention, a method that takes the velocity of the transducer heads into account to prevent such eventuality is incorporated into the present invention as will now be described with respect to FIG. 33.

Figure 33:
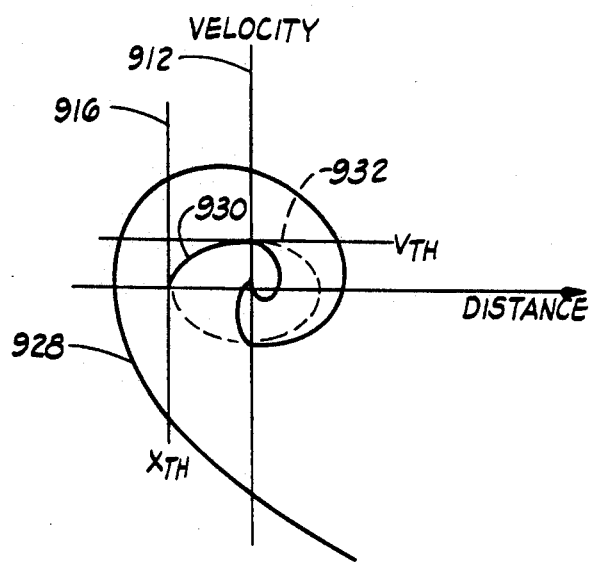
FIG. 33 is a phase plane plot illustrating the settling of a transducer head on a track.
Figure 34:
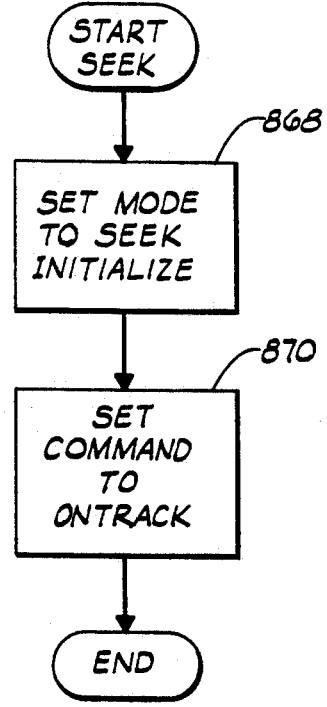
FIG. 34 is a flow chart for the seek command routine.

When transducer heads are displaced from a data track during track following, the servo system of the disc drive will drive the transducer heads toward the track, represented by the axis 912 in FIG. 33, and the transducer heads will oscillate about the track as they settle so that a phase plane diagram; that is, a plot of velocity versus distance from the data track, will have the form of a spiral as shown by the curve 928 in FIG. 33. In general, for a particular disc drive, such curve can be determined from a knowledge of the disc drive characteristics and the control scheme that is implemented during track following for any set of initial conditions for the transducer heads. In the practice of the present invention, a particular curve, shown at 930, is selected to provide a basis for defining an effective distance for the transducer heads from the track within which the transducer heads will remain with a selected on track threshold, Xth, for any initial conditions of transducer head location and velocity. Specifically, the curve 930 is selected for the initial conditions of zero velocity at a displacement of the transducer heads from the track being followed equal to the selected on track threshold as indicated by the line 916 in FIG. 33. For such initial conditions, the curve 932 will cross the velocity axis with a speed Vth as indicated by the line 914 in FIG. 33. The effective distance of the transducer heads from the track is then defined by the equation $$X^2_{eff} = X^2_{act} + \frac{(Xth)^2}{(Vth)^2} V^2_{act}$$

where Xact is the actual distance between the transducer heads and the track and Vact is the actual velocity of the transducer heads that can be approximated from successive servo position error measurements. The approximation for the actual velocity, an approximation which is suitable in many disc drives, is the difference between successive servo position error values divided by the time between successive measurements of the servo position error. In the present invention, the latter time is the time between interrupts of the servo microcomputer 278. The defining equation for the effective distance, for the case in which Xeff=Xth defines an ellipse that has been indicated in dashed lines at 932 in FIG. 33. As noted above, the value for Vth can be calculated using the known track following control equation and the characteristics of the disc drive. The calculation can then be experimentally verified by displacing transducer heads of a selection of drives of the generic type from a track and measuring the speed with which the heads cross the track.

Returning now to FIG. 32, following the output of the offset to the offset latch 402, the square of the effective distance to the data track currently being followed is calculated, step 818, and compared to the square of the track threshold at 802. If the effective distance is greater than the threshold, indicating that the read/write head may cross the on track threshold, writing is disabled, step 804, by outputting a number to the servo control latch 274 (FIG. 12) that will clock a logic level into the Q output of the flip flop 358 that will discontinue an on track signal provided to the read/write circuit 264 via conducting path 272. A selected address in the servo microcomputer RAM, "count", is then reset to zero, step 806, and the new command waiting routine ends. If the effective distance between the read/write head and the data track is less than the threshold, "count" is incremented, step 808, and compared, step 812, with a preselected number N, step 812. If "count" is greater than or equal to N, the on track signal is again provided to the read/write circuit 264 by outputting a number to the servo control latch that will clock a high logic level into the Q output of flip flop 358 (FIG. 12) and the "receive new command" routine ends. If not, the command ends without providing an on track signal.

Referring now to FIGS. 34 through 39, shown therein are flow charts for command and mode routines that are carried out when a seek command is issued by the system microcomputer to move the servo head to a new data track. During track following, such command will be received during an interrupt of the servo microcomputer at the step 860 of FIG. 32 and the command that will be inputted at such step is a "seek" command that has been illustrated by the flow chart of FIG. 34. Parameters, that will be identified during the discussion of the seek, will have been outputted by the system microcomputer 262 but none of these parameters will be needed for the seek command, per se, and none will be inputted during the step 862 of FIG. 32.

With the first interrupt following the reception of the seek command, before such command is executed, the mode routine will remain a fine control mode so that a correction signal will be determined, using a control equation having coefficients previously transferred to the servo microcomputer 278, and outputted to the actuator control circuit 404, as previously discussed with reference to FIG. 31. Similarly, a command will then be called as at step 856 of FIG. 31. However, since the command number now in the command address identifies a "seek" command, the steps shown in FIG. 34, rather than in FIG. 32 will be carried out in the execution of the command routine. Such command sets the mode address to a "seek initialize" mode, step 868 and sets the command address to an "on track" command, step 870. These routines will be carried out when the next interrupt occurs.

Figure 35:
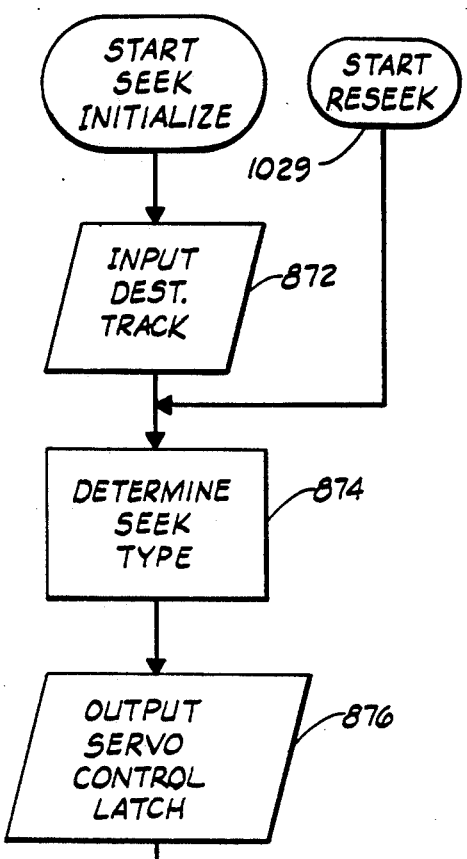
FIG. 35 is a flow chart for the seek initialization mode routine.
Figure 35:
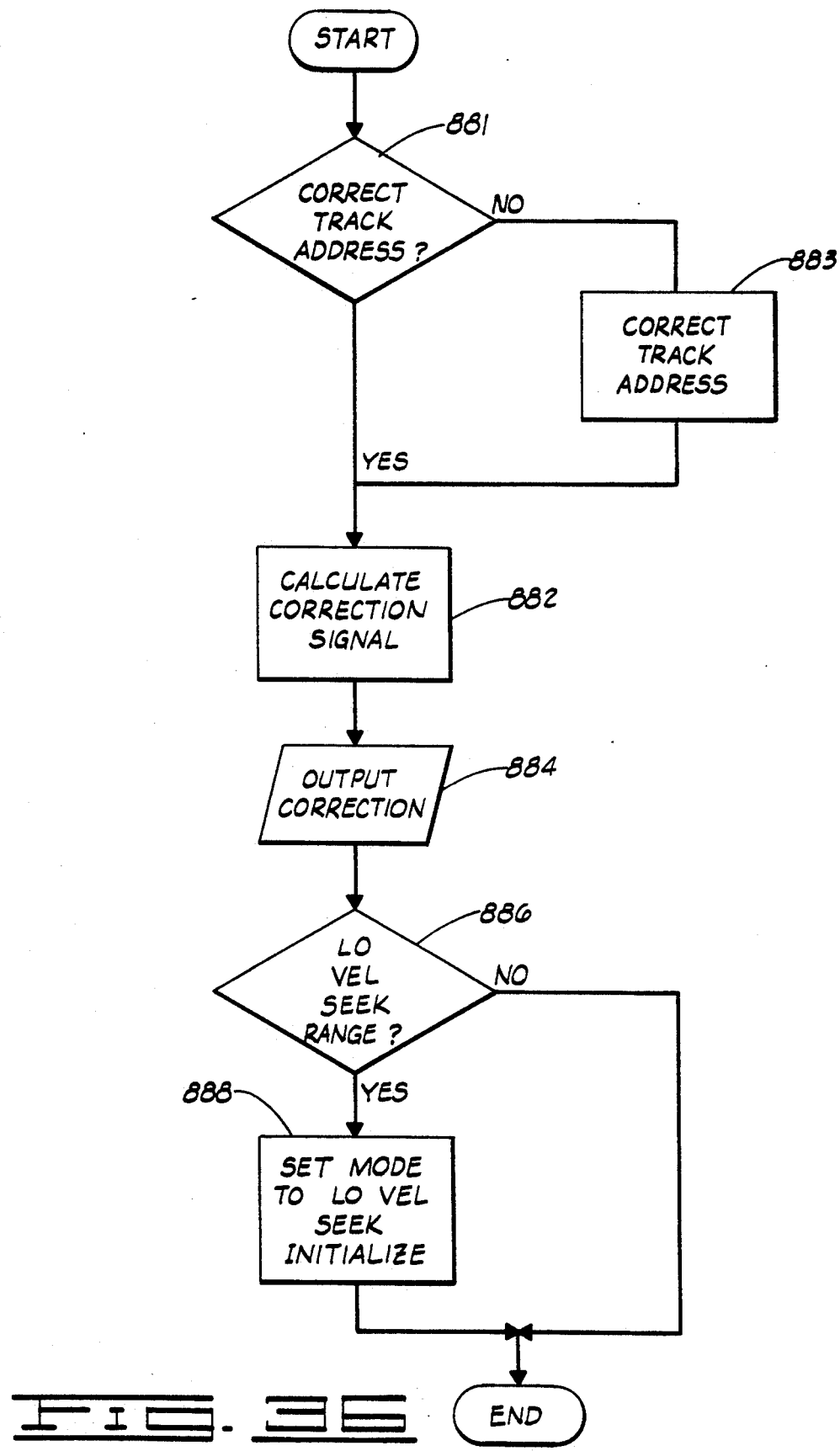

Thus, when the next interrupt occurs, the "seek initialize" mode, the flow chart for which is shown in FIG. 35 will be executed. It will be noted that the seek initialize routine does not contain a call command instruction so that no command routine will be executed following the execution of the seek initialization mode routine. Instead, the interrupt proceeds from the seek initialization mode to the update of the interrupt count, step 848 shown in FIG. 30, and the interrupt ends.

In the seek initialize mode routine, the destination track to which the seek is to be made is obtained, step 872, by inputting a parameter latch 352 into which such address has been entered by the system microcomputer in the manner that has been described above with respect to FIGS. 9 and 10. From the address of the destination track, and the address of the track currently being followed, a seek type is determined, step 874. As is conventional, such determination is made on the basis of the number of data tracks the servo head must be moved to reach the destination track. For purposes of discussion, it will be assumed that the servo head 116 is to displaced a large distance defined, in the present invention, as more than two data tracks. In such case, the initial portions of the seek to the destination track will be carried out in accordance with the "high velocity seek" mode shown in FIG. 36.

Continuing with FIG. 35, the servo circuit is initialized for the high velocity seek by selecting the limited fine control region about each track, extending to the midpoint between successive pairs of tracks, for determining the servo position error, setting the peak height detectors 532, 534, and 536 of the servo data recovery circuit 438 to generate the P1, P2 and P3 position signals from one subfield of the position field, and disabling writing by the read/write circuit 264. To this end, appropriate servo control signals, discussed above, are outputted to the servo control latch 274 as indicated by the step 876 in FIG. 35. Thus, during movement of the transducer heads to the destination track, the servo position error signal will indicate the distance between the servo head 116 and the nearest track therefrom on the dedicated servo surface 105.

Following the configuration of the servo circuit 436 for the seek, control equation coefficients that determine the appropriate correction signal for the measured value of the servo head velocity in relation to a velocity demand profile stored in the servo microcomputer ROM are inputted from parameter latches 352 into which such coefficients were entered by the system microcomputer 262 when the seek command was issued, step 878, and the mode number is set, step 880, to cause the selected seek type, a high velocity seek in the example at hand, to commence with the next interrupt.

The high velocity seek mode, the flow chart of which is shown in FIG. 36, will be executed while the transducer heads are accelerated and decelerated across the disc surfaces. In each interrupt that occurs while the high velocity seek mode continues, a correction signal will be determined and outputted to the actuator control circuit 404 using a control equation that is specialized to a high velocity seek using coefficients inputted at step 878 above.

As is conventional, the control equation used during track seeking in the hard disc drive 100 is an equation that determines the correction signal, at least in part, in relation to the velocity of the transducer heads across the disc surface and demand velocities that are stored during manufacture of the hard disc drive in ROM of the servo microcomputer 278. More specifically, it is contemplated that track seeking will be effected in accordance with the teachings of the above-referenced U.S. patent application entitled "Acoustic Noise Reduction in a Disc Drive Using a Time varying Exponential Demand Filter with an Anticipator". Thus, to effect the seek, it is necessary to determine the velocity of the transducer heads across the disc surface. As noted above, such velocity can be approximated by the distance the transducer heads have moved since the last interrupt. In another aspect of the present invention, error in such approximation are eliminated by track address verification steps indicated at 881 and 883 in FIG. 36.

As will be clear to those skilled in the art, the transducer heads may move across several tracks between interrupts during higher speed portions of the velocity profile used in determining the correction signal outputted to the actuator control circuit 404. In accordance with the present invention, the distance moved by the transducer heads between two successive interrupts is determined from the addresses of the tracks nearest the servo head 116 during the passage of the servo frames preceding the interrupts by the servo head 116 and the servo position errors generated by passage of such servo frame. The track address verification steps insure that the track addresses used in the determination are the addresses for the tracks between which the servo head 116 has moved.

As noted above, a track phase code is generated by the position circuit 450 during passage of the position field by the servo head 116 and, as indicated in Table 1, the track phase code repeats in groups of three data tracks. Thus, starting with outermost data tracks on the discs, the track phase codes are 0, 1, 2, 0, 1 ... Thus, the difference between the data track addresses and the track phase code will be, again starting with the outermost track on the discs, 0, 0, 0, 3, 3, 3, 6, 6, 6 ... That is, the difference is a number divisible by three. Thus, if the track address generated by the track address circuit is correct, the value of the difference, modulo 3, will be zero. In block 881 of FIG. 36, the remainder of the difference between the number in the address latch 458 and the track phase code in the phase latch 664 is determined during execution of the high velocity seek mode routine of each interrupt program to determine whether a bit of the Grey code address of a servo track might have been misread, a possibility that arises the when an edge of a servo element of the track address field passes the servo head 116 near the centerline of the servo head flux gap. Since, in accordance with the Grey code in which the track addresses are written to the track address field 160, one such edge will occur between each pair of servo tracks on the dedicated servo surface, the number in the address latch 458 at the time of an interrupt will be the correct track address, a number that is less than the track address by one or a number that is greater than the track address by one.

If the number in the address latch 458 is the track address, the remainder after division of the difference between such number and the track phase code will be zero and a correction signal to be outputted to the actuator control circuit is calculated at step 882 in FIG. 36. If such number is one greater than the track address, the remainder after division will be 1 and the track address is corrected at step 883 by subtracting one from the number in the address latch 458. If the number in the address latch is one less than the track address, the remainder will be two and the correct track address is determined at step 883 by adding one to the number in the address latch 458. In either case, the correction signal is then determined in step 882 of FIG. 36.

The correction signal is then outputted, step 884, to the correction signal latch 426 (FIG. 14) and a loop that determines whether the servo head is within two tracks of the destination track is entered. Such loop is comprised of the decision block 886 in which the track address and servo position error are used to determine the distance between the servo head and the destination track. If the distance is greater than two tracks to go, the high velocity seek mode for the current interrupt ends. As can be seen in FIG. 36, the high velocity seek mode routine contains no "call command" step so that no command routine will be executed. Thus, so long as the servo head 116 remains a distance greater than two data track spaces from the destination track, each new interrupt will merely cause a repetition of the high velocity seek mode routine shown in FIG. 36.

Figure 37:
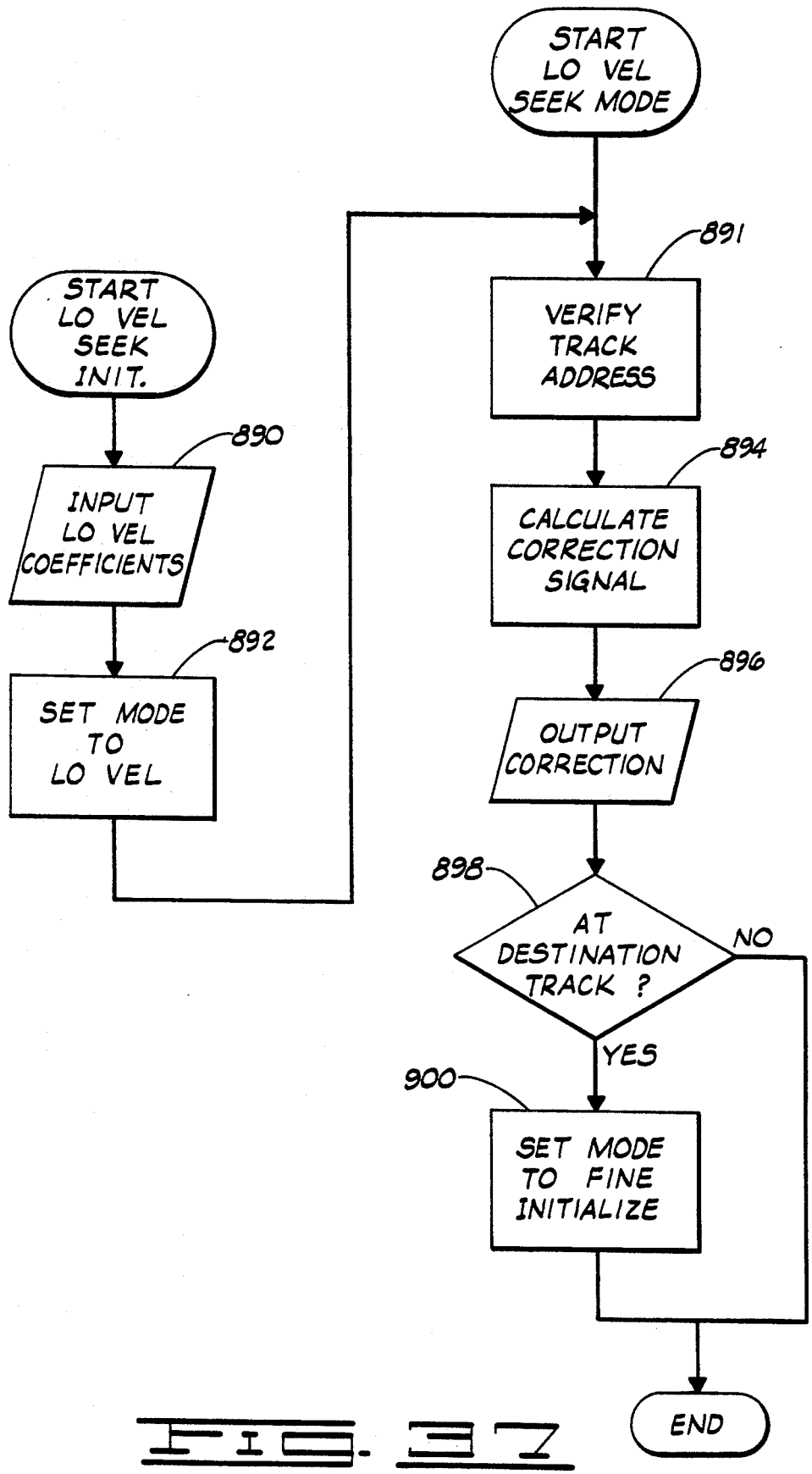
FIG. 37 is a flow chart for the low velocity seek initialization and low velocity seek mode routines.

Once an interrupt occurs in which the servo head 116 is within a distance of two track spacings from the destination track, the decision block 886 of FIG. 36, will be followed with a step, step 888, in which the mode is set to the low velocity seek initialize routine shown in FIG. 37.

FIG. 37 contemplates that a control equation differing from that of the high velocity seek control equation, or having different values for the coefficients of such equation, will be used to continue the seek in the low velocity seek mode. Thus, the first step, step 890, of the low velocity seek initialization mode is to input coefficients of the control equation used to determine correction signals to be outputted to the actuator control circuit 404. The next step, at 892, is to set the mode to the low velocity seek mode so that, on the next interrupt, the mode routine that will be executed will be the low velocity seek mode routine. The mode execution then continues with a track address verification step 891, carried out as described above, and the calculation of the correction signal, at 894, in accordance with the control equation selected for the low velocity seek mode. The correction signal is outputted to the actuator control circuit 404, step 896, and, at decision block 898, it is determined whether the servo head 116 is deemed to have reached the destination track. A preferred criterion is that the centerline of the servo head 116 is within one half data track spacing of track center for the destination track. When such criterion is met, the mode number is set to the fine control initialize mode routine, step 900, that has been illustrated with the fine control mode routine, used for track following, in FIG. 31. Since the low velocity seek mode does not include a call command instruction, no command routine is executed following step 900 of FIG. 37.

Returning to FIG. 31, at the next interrupt, the servo circuit will be initialized for track following by selection of the extended fine control regions about the data tracks for determination of the servo position error and selection of all subfields of the position field for generation of the position signals to be used for the determination of the servo position error. Such selection will be effected, at step 902, by outputting appropriate numbers to the servo control latch 274 as has been described above.

Following the outputting of servo control data to the servo control latch, coefficients for the control equation utilized during track following are inputted from the parameter latches 352, into which such coefficients were entered by the system microcomputer when the seek command was issued, at step 904. Additionally, any adaptive offset values that may be used in track following are obtained from parameter latches 352 at step 906.

The fine control initialization mode routine ends with setting of the mode number to the fine control mode, so that the fine control mode routine will be executed in subsequent interrupts, and then proceeds, in the same interrupt, to the first step of the fine control mode used for track following. As noted above, such routine includes a call command step, step 856, so that a command will be executed prior to termination of the interrupt in which the seek initialization mode routine takes place. Such command will be the on track command that was entered into the command latch 350 by the system microcomputer 262 at the start of the seek and entered into the command address with the first interrupt that initiated the seek. A flow chart for the on track command has bee presented in FIG. 38.

The first steps, 908 and 1010, of the on track command routine are the calculation of the square of the effective distance, Xeff, to the destination track and the comparison of such value to the square of the on track threshold, Xth, selected for writing to data discs. If Xeff is less than Xth, the "count" location in RAM is incremented, step 1012, and a second comparison, step 1014, is made; to determine whether such count has reached a preselected value indicated in FIG. 38 as M. A suitable value for M is three. If so the command address is set to a check track routine, at block 1016, that has been illustrated in FIG. 39. If the effective track distance is greater than the on track threshold for any interrupt before the maximum track count is reached, the track count will be reset by the decision step 1010 and a reset instruction indicated at 1018 in FIG. 37. Thus, on track command routine insures that the effective distance between the transducer heads and the destination track will be within the on track threshold for a number of successive interrupts given by the maximum value chosen for track count in the step 1014.

FIG. 39 is a flow chart for the check track command routine. In such routine, the track address of the destination track, corrected if need be as has been described above, is compared, step 1020, to the destination track that was inputted by the servo microcomputer 27 during the "initialize seek" mode routine (FIG. 31) and, if the two are the same, the command routine is set to the "receive new command" command routine (FIG. 32) at step 1022. An on track signal is outputted, step 1024, to the flip flop 358 of the servo control latch 274 to be transmitted to the read/write circuit 264 on conducting path 272 (FIG. 6) to enable writing to proceed. A command executed notice is then outputted to the command executed latch 318, at step 1026, to be read by the system microcomputer 262 and the disc drive returns to track following as described above at the destination track. If the servo head is not on the destination track, the comparison of the track being followed with the destination track sets the mode to a reseek mode, step 1028, and sets the command to "on track", step 1030 so that, at the next interrupt, the mode returns to the determination of the "determine seek type" step 874 of the seek initialize mode routine as shown (START RESEEK 1029) in FIG. 35. Thus, a new seek to the destination track will be made.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A servo system for a hard disc drive comprising:
    a rotating disc having a servo surface formatted with a plurality of position servo elements radially and longitudinally positioned on said surface to define a plurality of concentric servo tracks on the servo surface;
    position signal generation means including a servo head proximate the servo surface for generating a plurality of position signals having amplitudes indicative of the location of the servo head with respect to the servo elements in response to passage of the servo elements by the servo head;
    a difference amplifier for generating a servo position error signal indicative of the location of the servo head with respect to the servo tracks in response to a pair of position signals received by the difference amplifier;

position signal selection means connected between the position signal generation means and the difference amplifier for selecting a pair of position signals and transmitting the selected pair to the difference amplifier, wherein the position signal selection means is characterized as operable in a track seeking mode for selecting position signals to transmit to the difference amplifier in relation to relative amplitudes of the position signals and operable in a track following mode for transmitting a selected pair of position signals to the difference amplifier; and means for positioning the servo head in relation to the servo position error signal.

2. The servo system of claim 1 wherein the position servo elements on the servo surface of the disc are characterized as comprising:

a plurality of radially extending first servo elements each having a radial extent of substantially three track spacings and each separated by three track spacings;

a plurality of radially extending second position servo elements each having a radial extent of substantially three track spacings and each separated by three track spacings, wherein the second position servo elements are radially offset from the first servo elements by two track spacings; and a plurality of radially extending third position servo elements each having a radial extent of substantially three track spacings and each separated by three track spacings, wherein the third position servo elements are radially offset from each of the first and second servo elements by two track spacings.

3. The servo system of claim 1 wherein the servo surface is further characterized as formatted to define a plurality of servo frames extending in a circle along the servo tracks, each frame comprising a position field comprised of a plurality of identical subfields to which a plurality of position servo elements are written; wherein the position signal generation means comprises:

a plurality of peak height detectors, each peak height detector responsive to signals received by such peak height detector for generating one of said position signals;

means for providing electrical connection between the servo head and each peak height detector during passage of a selected position servo element of one position subfield by the servo head during operation of the position signal selection means in the track seeking mode and providing electrical connection between the servo head and each peak height detector during passage of said selected position servo element of the position subfield during operation of the position selection means in the track following mode; and means for adjusting the time constants of the peak height detectors.

4. In a hard disc drive, a disc having a surface formatted with a plurality of position servo elements radially and longitudinally positioned on said surface to define a plurality of concentric servo tracks having a selected track spacing on the servo surface, wherein the position servo elements comprise:

a plurality of radially extending first servo elements each having a radial extent of substantially three track spacings and each separated by three track spacings;

a plurality of radially extending second position servo elements each having a radial extent of substantially three track spacings and each separated by three track spacings, wherein the second position servo elements are radially offset from the first servo elements by two track spacings; and a plurality of radially extending third position servo elements each having a radial extent of substantially three track spacings and each separated by three track spacings, wherein the third position servo elements are radially offset from each of the first and second servo elements by two track spacings.

5. In a servo system for a hard disc drive of the type operable in a track seeking mode for moving a transducer head between concentric tracks defined on a rotating disc and in a track following mode for maintaining radial alignment between the transducer head and a selected track on the disc, a method for locating the transducer head with respect to the tracks on the disc comprising the steps of:

defining a limited fine control region about each track of the disc to extend substantially one half track space to either side of the track;

defining an extended fine control region about each track of the disc to extend substantially one track space to either side of the track;

generating a servo position error signal indicative of the location of the transducer head within the limited fine control region about the track nearest the transducer head during operation of the hard disc drive in the track seeking mode; and generating a servo position error signal indicative of the location of the transducer head within the extended fine control region about the selected track in the track following mode of operation of the servo head.

6. In a hard disc drive servo system of the type comprising a rotating disc having a servo surface magnetically formatted with a servo pattern defining a plurality of concentric servo tracks on the servo surface, a servo head proximate the servo surface for generating signals indicated of passage of elements of the servo pattern by the servo head, and means electrically connected to the servo head for radially positioning the servo head on the servo surface in response to signals generated by the servo head, the improvement wherein the servo pattern is characterized as comprising a plurality of consecutive servo frames extending longitudinally along the servo tracks, each servo frame having a track address field wherein the servo elements are positioned for generation in the servo head of signals indicative of the servo track nearest the servo head and a position field wherein the servo elements are positioned for generation in the servo head of signals indicative of the radial location of the servo head with respect to said nearest servo track, and wherein the means for generating signals for radially positioning the servo head in response to signals generated by the servo head comprises:

track address means responsive to passage of the track address field of each servo frame for generating a digitally expressed track address for the servo track nearest the servo during passage of the track address field; and servo position error generation means for generating a digitally expressed servo position error indicative of the location of the servo head in relation to the servo track nearest the servo head during the passage of the position field; and wherein the servo position error generation means is further characterized as comprising means for generating a track phase code differing for each pair of adjacent servo tracks and repeating for each of a plurality of radially consecutive groups of tracks in relation to the track address of the servo track nearest the servo head during passage of the position field by the servo head.

7. In a hard disc drive for storing computer files, wherein the hard disc drive is of the type including a plurality of rotating discs, a plurality of read/write head for writing the computer files to data surfaces of the discs and reading information from the data surfaces, a read/write circuit connected between the read/write heads and an interface with a computer for transmitting the files to the read/write heads and recovering the files from the read/write heads, a system microcomputer for controlling the operation of the hard disc drive for storing information at selected locations on the disc data surfaces, and a servo system for radially positioning the read/write heads in accordance with servo commands received from the system microcomputer, wherein the servo system comprises a servo head adjacent a servo surface of one of the discs formatted with a servo pattern defining a plurality of concentric servo tracks on the servo surface, a servo circuit connected to the servo head for generating servo data indicative of the radial location of the servo head on the servo surface, a servo microcomputer connected to the servo circuit for reading the servo data, receiving the servo commands, and generating correction signals from the servo data in relation to the servo commands received from the system microcomputer, and means for receiving the correction signals and positioning the read/write and servo heads in relation to the correction signals, a communication circuit connected between the servo microcomputer and the system microcomputer comprising:

a command latch connected to the system microcomputer for outputting servo commands to the command latch by the system microcomputer and connected to the servo microcomputer for inputting the commands from the command latch into a selected port of the servo microcomputer in response to a read strobe received from the servo microcomputer;

a plurality of parameter latches connected to the system microcomputer for outputting parameters utilized in implementing servo commands by the servo microcomputer to the parameter latches by the system microcomputer and connected to the servo microcomputer for inputting the parameters from the parameter latches into said selected port of the servo microcomputer in response to read strobes received from the servo microcomputer; and latch selection means connected between the servo microcomputer and the command and parameter latches for selecting a latch to be read by the servo microcomputer, wherein the latch selection means is characterized as comprising:

a demultiplexer connected between the servo microcomputer and the command and parameter latches for transmitting a read strobe from the servo microcomputer to a selected one of said latches in accordance with a digitally expressed selection signal received by the demultiplexer; and a counter connected to the demultiplexer for provide the selection signal to the demultiplexer and connected to the servo computer for receiving an initial count selecting one of said latches and for incrementing said count each time a read strobe for said selected servo microcomputer input port is issued.

8. In a hard disk drive of the type comprising a plurality of rotating discs wherein a servo pattern is written to a servo surface on one disc to define a plurality of concentric data tracks for the disks, a plurality of transducer heads proximate the disc surfaces including a servo head adjacent the servo surface, and a plurality of read/write heads proximate data surfaces of the disks for reading and writing data to and from the data surfaces, actuator means for positioning the servo and read/write heads in response to control signals received by the actuator means; servo means connected to the servo head for determining the location of the transducer heads with respect to the servo tracks and generating said control signals; and means operable in response to an on track signal for operating a selected read/write head to write data to a selected track on a selected data surface, a method for the preventing a read/write head from writing data at such times that the read/write head is radially displaced from a data track to which the data is to be written by an amount greater than a preselected on track threshold distance comprising the steps of:

repetitively measuring the distance between the read/write head and the said data track;

for each measured distance between the read/write head and the selected track, determining the velocity of the read/write head from successive values of the distance between the read/write head and said track;

for each measured distance between the selected transducer head and the selected track, determining an effective track distance in accordance with a preselected relation to the distance and velocity that is indicative of future movement of the transducer head with respect to the tracks; and issuing the on track signal only at such times that the effective track distance does not exceed the on track threshold distance.

9. In a servo system for a hard disc drive of the type comprising a rotating disc having a servo surface formatted with a plurality of position servo elements radially and longitudinally positioned on said surface to define a plurality of concentric servo tracks on the servo surface; position signal generation means including a servo head proximate the servo surface for generating a plurality of position signals having amplitudes indicative of the location of the servo head with respect to said servo tracks in response to passage of the servo elements by the servo head; and means responsive to the position signals for moving the servo head radially across the servo surface to a selected servo track in a track seeking mode of operation of the servo system and subsequently controlling the position of the servo head with respect to the selected track in a track following mode of operation of the servo system, the improvement wherein the servo surface is further characterized as formatted to define a plurality of servo frames extending in a circle along said tracks, each frame comprising a position field comprised of a plurality of identical subfields to which a plurality of position servo elements are written; and wherein the position signal generation means comprises:

a plurality of peak height detectors, each peak height detector responsive to signals received by such peak height detector for generating one of said position signals;

means for providing electrical connection between the servo head and each peak height detector during passage of a selected position servo element of one position subfield by the servo head during operation of the position signal selection means in the track seeking mode and providing electrical connection between the servo head and each peak height detector during passage of said selected position servo element of the position subfield during operation of the position selection means in the track following mode; and means for adjusting the time constants of the peak height detectors.

10. A method for controlling the movement and location of a servo head of a disc drive servo system with respect to servo tracks defined on a servo surface of a disc proximate the servo head, wherein said tracks are defined by position servo elements magnetically written to the surface in a pattern extending radially and longitudinally along said surface, comprising the steps of:

repetitively generating each of a plurality of position signals indicative of the location of the servo head from a single position servo element at such times that the servo system is operated in a track seeking mode of operation wherein the servo head is moved from one servo track on the servo surface to a second servo track on the servo surface;

repetitively generating each of said plurality of position signals indicative of the location of the servo head from a series of position servo element at such times that the servo system is operated in a track following mode of operation wherein the position of the servo head is controlled with respect to a selected servo track; and accelerating the servo head in relation to the position signals.

11. In a disc drive servo system of the type including a rotating disc having a servo surface formatted with a plurality of position servo elements radially and longitudinally positioned on the servo surface to define a plurality of concentric servo tracks on the servo surface, a servo head proximate the servo surface for reading the position servo elements, position signal generation means connected to the servo head for generating position signals indicative of the servo head location on the servo surface from signals induced in the servo head by passage of the position servo elements, and means responsive to the amplitudes of selected pairs of the position signals for controlling the position of the servo head on the servo surface, the improvement wherein the servo elements and the servo head are configured such that, for each servo track defined on the servo surface, the difference in amplitude between a selectable pair of position signals is substantially linear over a range extending to each adjacent track on the servo surface.

* * * * *

UNITED STATES PATENT AND TRADEMARK OFFICE
CERTIFICATE OF CORRECTION

PATENT NO. : 5,262,907

DATED : November 16, 1993

INVENTOR(S) : Dennis D. Duffy, Lealon R. McKenzie, Fereidoon Heydari & Philip R. Woods It is certified that error appears in the above-indentified patent and that said Letters Patent is hereby corrected as shown below:

Title page, References Cited, delete "4,977,472 12/1990 Volz et al. 360/78.14" and substitute therefor -- 4,977,472 12/1990 Volz et al. 360/78.140 --;

Column 6, line 54, delete "pas" and substitute therefor -- pass --;

Column 8, line 21, delete "tim" and substitute therefor -- time --;

Column 17, line 36, delete "passe" and substitute therefor -- passes --;

Column 20, line 37, delete "path 55" and substitute therefor --path 554--;

Column 20, line 41, delete "detector 32" and substitute therefor -- detector 531 --;

Column 23, line 45, delete "O1" and substitute therefor -- 1 --;

Column 23, line 45, delete "O2" and substitute therefor -- 2 --;

Column 24, line 4, after "570" insert a comma -- , --;

Column 26, line 62, after "servo" delete the comma ",";

Column 27, line 12, delete "illustrates;" and substitute therefor --illustrates:--;

Column 27, line 15, delete "(2), pulses" and substitute therefor -- (2), on time line 692, pulses --;

Column 30, line 31, after "track" delete "2";

UNITED STATES PATENT AND TRADEMARK OFFICE
CERTIFICATE OF CORRECTION

PATENT NO. : 5,262,907
DATED : November 16, 1993
INVENTOR(S) : Dennis D. Duffy, Lealon R. McKenzie, Fereidoon Heydari & Philip R. Woods It is certified that error appears in the above-indentified patent and that said Letters Patent is hereby corrected as shown below:

Column 31, line 45, delete "numbers" and substitute therefor -- number --;

Column 37, line 65, delete "bee" and substitute therefor -- been --;

Column 38, line 7, delete "If so command address" and substitute therefor -- If so, a check track address --;

Column 38, line 8, delete "a check track" and substitute therefor -- the "new comand" --; and Column 38, line 23, delete "microcomputer 27" and substitute therefor -- microcomputer 278 --.

Signed and Sealed this

Twenty-first Day of June, 1994

Attest:

BRUCE LEHMAN

*Attesting Officer*  *Commissioner of Patents and Trademarks*